(12) United States Patent
Atienza et al.

(10) Patent No.: US 10,611,857 B2
(45) Date of Patent: Apr. 7, 2020

(54) BISPHENOLATE TRANSITION METAL COMPLEXES, PRODUCTION AND USE THEREOF

(71) Applicant: ExxonMobil Chemical Patents Inc., Baytown, TX (US)

(72) Inventors: Crisita Carmen H. Atienza, Houston, TX (US); David A. Cano, Houston, TX (US); Catherine A. Faler, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 2 days.

(21) Appl. No.: 16/005,089

(22) Filed: Jun. 11, 2018

(65) Prior Publication Data

US 2019/0040161 A1 Feb. 7, 2019

Related U.S. Application Data

(60) Provisional application No. 62/540,449, filed on Aug. 2, 2017.

(51) Int. Cl.
*C08F 10/02* (2006.01)
*C08F 4/659* (2006.01)

(52) U.S. Cl.
CPC .............. *C08F 10/02* (2013.01); *C08F 4/659* (2013.01); *C08F 4/65908* (2013.01); *C08F 4/65912* (2013.01); *C08F 2410/01* (2013.01)

(58) Field of Classification Search
None
See application file for complete search history.

(56) References Cited

U.S. PATENT DOCUMENTS

| | | |
|---|---|---|
| 6,232,421 B1 | 5/2001 | Fujita et al. |
| 6,333,389 B2 | 12/2001 | Whiteker et al. |
| 6,333,423 B1 | 12/2001 | Kol et al. |
| 6,596,827 B2 | 7/2003 | Kol et al. |
| 7,812,104 B2 | 10/2010 | Canich et al. |
| 8,791,217 B2 | 7/2014 | Hlavinka et al. |
| 8,907,032 B2 | 12/2014 | Kol et al. |
| 9,365,661 B2 | 6/2016 | Giesbrecht et al. |
| 9,382,249 B2 | 7/2016 | Harrington et al. |
| 9,745,327 B2 | 8/2017 | Atienza et al. |
| 2013/0066029 A1 | 3/2013 | Radlauer et al. ............. 526/171 |
| 2013/0172498 A1 | 7/2013 | Hlavinka et al. |
| 2016/0280722 A1 | 9/2016 | Atienza et al. |
| 2017/0096510 A1 | 4/2017 | Ye et al. ............... C08F 210/16 |

(Continued)

FOREIGN PATENT DOCUMENTS

| | | |
|---|---|---|
| WO | 99/04824 | 2/1999 |
| WO | 2007/130306 | 11/2007 |

(Continued)

OTHER PUBLICATIONS

Groysman et al., "From THF to Furan: Activity Tuning and Mechanistic Insight via Sidearm Donor Replacement in Group IV Amine Bis(phenolate) Polymerization Catalysts," Organometallics, 2003, vol. 22, No. 15, pp. 3013-3015.

(Continued)

*Primary Examiner* — Catherine S Branch
(74) *Attorney, Agent, or Firm* — Catherine L. Bell

(57) ABSTRACT

Bis phenolate transition metal complexes are disclosed for use in alkene polymerization, with optional chain transfer agent, to produce polyolefins.

42 Claims, 1 Drawing Sheet

(56) References Cited

U.S. PATENT DOCUMENTS

2018/0030167 A1 2/2018 Atienza et al.

FOREIGN PATENT DOCUMENTS

| WO | 2012/098521 | 7/2012 |
| WO | 2016/153682 | 9/2016 |

OTHER PUBLICATIONS

Groysman et al., High Molecular Weight Atactic Polypropylene prepared by Zirconium Complexes of an Amine Bis(phenolate) Ligand, Israel Journal of Chemistry, 2002, vol. 42, No. 4, pp. 373-381.

Tshuva et al., Zirconium Complexes of Amine-Bis(phenolate) Ligands as Catalysts for 1-Hexene Polymerization: Peripheral Structural Parameters Strongly Affect Reactivity, Organometallics, 2001, vol. 20, No. 14, pp. 3017-3028.

Hustad et al., "Continuous Production of Ethylene-Based Diblock Copolymers Using Coordinative Chain Transfer Polymerization," Macromolecules, 2007, vol. 40, No. 20, pp. 7061-7064.

Tshuva et al., "Novel zirconium complexes of amine bis(phenolate) ligands. Remarkable reactivity in polymerization of hex-1-ene due to an extra donor arm," Chemical Communications, 2000, pp. 379-380.

Tshuva et al., "[ONXO]-Type Amine Bis(phenolate) Zirconium and Hafnium Complexes as Extremely Active 1-Hexene Polymerization Catalysts," Organometallics, 2002, vol. 21, No. 4, pp. 662-670.

Reybuck et al., "Amine Bis(phenolate) Zirconium Complexes: Influence of Ligand Structure and Cocatalyst on Copolymerization Behavior," Macromolecules, 2005, vol. 38, No. 7, pp. 2552-2558.

Zilkha et al., "Syntheses of Hydroxyalkyl and Mercaptoalkyl Derivatives of Sulfur-contining Amino Acids," Journal of Organic Chemistry, 1963, vol. 28, pp. 1105-1107.

Gendler, S. et al. (2006) "Polymerization of 4-Methylpentene and Vinylcyclohexane by Amine Bis(phenolate) Titanium and Zirconium Complexes," *Jrnl. Polymer Sci., Part A, Polymer Chemistry*, v.44(3), pp. 1136-1146.

Groysman, S. et al. (2004) "Diverse Structukre-Activity Trends in Amine Bis(phenolate) Titanium Polymerization Catalysts," *Organometallics*, v.23(22), pp. 5291-5299.

Pletcher, P. D. et al. (2016) "Quantitative Comparative Kinetics of 1-Hexene Polymerization Across Group IV Bis-Phenolate Catalysts," *ACS Catalysis*, v.6(8), pp. 5138-5145.

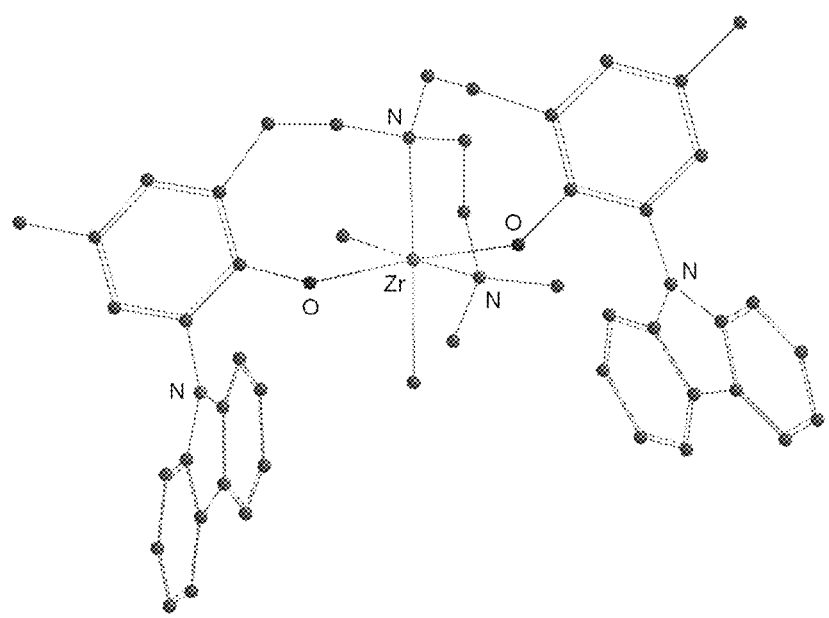

BISPHENOLATE TRANSITION METAL COMPLEXES, PRODUCTION AND USE THEREOF

PRIORITY CLAIM

This application claims priority to and the benefit of U.S. Ser. No. 62/540,449, filed Aug. 2, 2017 and is incorporated by reference in its entirety.

FIELD OF THE INVENTION

The invention relates to bisphenolate transition metal complexes and processes for use of such complexes as catalysts for alkene polymerization processes, with or without chain transfer agents.

BACKGROUND OF THE INVENTION

Olefin polymerization catalysts are of great use in industry. Hence there is interest in finding new catalyst systems that increase the commercial usefulness of the catalyst and allow the production of polymers having improved properties.

Catalysts for olefin polymerization can be based on bisphenolate complexes as catalyst precursors, which are typically activated with an alumoxane or with an activator containing a non-coordinating anion.

Amine bis(phenolate) zirconium complexes have been used as transition metal components in the polymerization of ethylene and hexene, see for example, Macromolecules 2005, 38, 2552-2558.

U.S. Pat. No. 6,596,827 discloses amine bis(phenolate) compounds for use as alpha olefin polymerization catalysts.

This invention relates to U.S. Ser. No. 15/051,421, filed Feb. 23, 2016, and published as US 2016/0280722, which claims priority to and the benefit of U.S. Ser. No. 62/137,417, filed Mar. 24, 2015.

This invention also relates to U.S. Ser. No. 62/368,247, filed Jul. 29, 2016 and applications claiming priority thereto.

Other references of interest include: US 2016/0280722; US 2002/0019503; WO 2016/153682; U.S. Pat. No. 8,791,217; US 2013/0172498; U.S. Pat. No. 7,812,104; US 2014/0039137; U.S. Ser. No. 14/406,414, filed Aug. 2, 2013; U.S. Pat. Nos. 6,232,421; 6,333,389; 6,333,423; 8,907,032; 8,791,217; US 2002/0019503; WO 2012/098521; WO 2007/130306; Israel Journal of Chemistry Volume 42, 2002 pg. 373-381; Organometallics 2001, 20, 3017-3028; Macromolecules, 2007, 40, 7061-7064; Chem. Comm. 2000, 379-380; Organometallics 21, 2002, 662-670; and Organometallics 2003, vol. 22, pp. 3013-3015.

There still is need for adding to the range of catalysts complexes that may be prepared and broaden their performance in alkene polymerization. Further, there is a need in the art for new catalysts with high activity that can produce crystalline polymers with good molecular weights.

SUMMARY OF THE INVENTION

This invention relates to ligands represented by the formula (A)

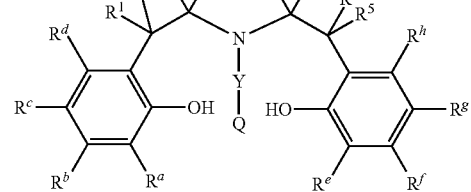

where Q is a neutral group comprising at least one atom from Group 15 or Group 16 (such as O, N, S, and P);
Y is a divalent $C_1$-$C_{40}$ (alternatively $C_1$-$C_{20}$) hydrocarbyl or substituted divalent hydrocarbyl group, and Y can form a substituted or unsubstituted heterocycle with Q which may or may not be aromatic and may or may not have multiple fused rings;
each $R^a$, $R^b$, $R^c$, $R^d$, $R^e$, $R^f$, $R^g$, and $R^h$ is, independently, a hydrogen, a $C_1$-$C_{40}$ hydrocarbyl radical, a $C_1$-$C_{40}$ substituted hydrocarbyl radical, a heteroatom or a heteroatom-containing group, or two or more of $R^a$ to $R^h$ adjacent to each other may independently join together to form a $C_4$-$C_{62}$ cyclic, polycyclic or heterocyclic ring structure, or a combination thereof; and
each $R^1$, $R^2$, $R^3$, $R^4$, $R^5$, $R^6$, $R^7$, and $R^8$ is, independently, a hydrogen, a $C_1$-$C_{40}$ hydrocarbyl radical, a $C_1$-$C_{40}$ substituted hydrocarbyl radical, a heteroatom or a heteroatom-containing group, or $R^1$ and or $R^2$ may form a $C_4$-$C_{62}$ cyclic or polycyclic ring structure with $R^3$ and or $R^4$, and $R^5$ and or $R^6$ may form a $C_4$-$C_{62}$ cyclic or polycyclic ring structure with $R^7$ and or $R^8$, or a combination thereof.

This invention relates to transition metal complexes represented by the formula (I):

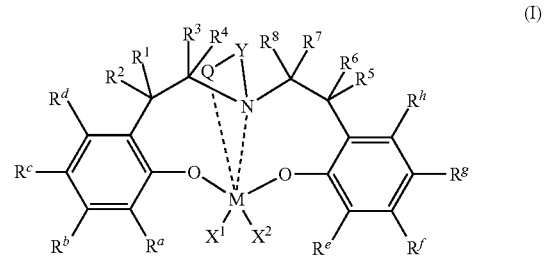

wherein M is a Group 4 transition metal;
$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;
Q is a neutral donor group, typically comprising at least one atom from Group 15 or Group 16 (such as O, N, S, and P);
Y is a divalent $C_1$-$C_{40}$ (alternatively $C_1$-$C_{20}$) hydrocarbyl or substituted divalent hydrocarbyl group, and Y can form a substituted or unsubstituted heterocycle with Q which may or may not be aromatic and may or may not have multiple fused rings;
each $R^a$, $R^b$, $R^c$, $R^d$, $R^e$, $R^f$, $R^g$, and $R^h$ is, independently, a hydrogen, a $C_1$-$C_{40}$ hydrocarbyl radical, a $C_1$-$C_{40}$ substituted hydrocarbyl radical, a heteroatom or a heteroatom-containing group, or two or more of $R^a$ to $R^h$ adjacent to each other may independently join together to form a $C_4$-$C_{62}$ cyclic, polycyclic or heterocyclic ring structure, or a combination thereof; and $R^1$, $R^2$, $R^3$, $R^4$, $R^5$, $R^6$, $R^7$, and $R^8$ is, independently, a hydrogen, a $C_1$-$C_{40}$ hydrocarbyl radical, a $C_1$-$C_{40}$ substituted hydrocarbyl radical, a heteroatom or a heteroatom-containing group, or $R^1$ and or $R^2$ may form a $C_4$-$C_{62}$ cyclic or polycyclic ring structure with $R^3$ and or $R^4$, and $R^5$ and or $R^6$ may form a $C_4$-$C_{62}$ cyclic or polycyclic ring structure with $R^7$ and or $R^8$, or a combination thereof.

This invention also relates to a catalyst system comprising an activator and the catalysts described herein.

This invention also relates to a process to make polyolefin using the catalysts described herein.

This invention further relates to methods to polymerize olefins using the above complex in the presence of a chain transfer agent.

BRIEF DESCRIPTION OF THE FIGURE

The FIGURE is a ball and stick model of 1-Zr. Hydrogen atoms of the molecule and the phenyl moiety of benzyl groups were omitted for clarity.

DETAILED DESCRIPTION OF THE INVENTION

The specification describes transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator, which is believed to create a cation as a result of the removal of an anionic group, often referred to as a leaving group, from the transition metal.

In the structures depicted throughout this specification and the claims, a solid line indicates a bond, an arrow indicates that the bond may be active, and each dashed line represents a bond having varying degrees of covalency and a varying degree of coordination.

As used herein, the numbering scheme for the Periodic Table groups is the new notation as set out in Chemical and Engineering News, 63(5), 27 (1985).

As used herein, Me is methyl, Et is ethyl, Bu is butyl, t-Bu and $^t$Bu are tertiary butyl, Pr is propyl, iPr and $^i$Pr are isopropyl, Cy is cyclohexyl, THF (also referred to as thf) is tetrahydrofuran, Bn is benzyl, $[H_2CO]_x$ is paraformaldehyde, and Ph is phenyl.

The terms "hydrocarbyl radical," "hydrocarbyl" and "hydrocarbyl group" are used interchangeably throughout this document unless otherwise specified. For purposes of this disclosure, a hydrocarbyl radical is defined to be $C_1$ to $C_{70}$ radicals, or $C_1$ to $C_{20}$ radicals, or $C_1$ to $C_{10}$ radicals, or $C_6$ to $C_{70}$ radicals, or $C_6$ to $C_{20}$ radicals, or $C_7$ to $C_{20}$ radicals that may be linear, branched, or cyclic and aromatic or non-aromatic.

For purposes herein, a carbazole radical or substituted carbazole radical is represented by the formula:

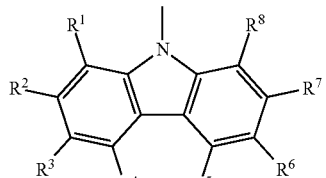

wherein each $R^1$ through $R^8$ is, independently, a hydrogen, a $C_1$-$C_{40}$ hydrocarbyl radical, a functional group comprising elements from Group 13 to 17 of the periodic table of the elements, or two or more of $R^1$ to $R^8$ may independently join together to form a $C_4$ to $C_{62}$ cyclic or polycyclic or heterocyclic ring structure, or a combination thereof.

A substituted or unsubstituted fluorenyl radical is represented by the formula:

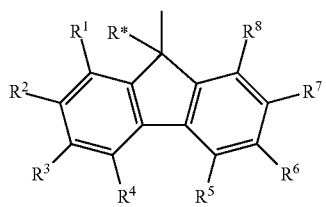

wherein each $R^1$ through $R^8$ is, independently, a hydrogen, a $C_1$-$C_{40}$ hydrocarbyl radical, a functional group comprising elements from Group 13 to 17 of the periodic table of the elements, or two or more of $R^1$ to $R^8$ may independently join together to form a $C_4$ to $C_{62}$ cyclic or polycyclic or heterocyclic ring structure, or a combination thereof; R* is a hydrogen, a $C_1$-$C_{40}$ hydrocarbyl radical, a substituted $C_1$-$C_{40}$ hydrocarbyl radical (preferably R* is methyl, phenyl, tolyl, substituted phenyl, or substituted tolyl).

The term "catalyst system" is defined to mean a complex/activator pair. When "catalyst system" is used to describe such a pair before activation, it means the unactivated catalyst complex (precatalyst) together with an activator, optionally, a chain transfer agent, and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system.

Complex, as used herein, is also often referred to as catalyst precursor, precatalyst, catalyst, catalyst compound, transition metal compound, or transition metal complex. These words are used interchangeably.

A "neutral donor group" is a neutrally charged group which donates one or more pairs of electrons to a metal.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this invention, ethylene shall be considered an α-olefin.

For purposes of this invention and claims thereto, the term "substituted" means that a hydrogen group has been replaced with a heteroatom, or a heteroatom-containing group. For example, a "substituted hydrocarbyl" is a radical made of carbon and hydrogen where at least one hydrogen is replaced by a heteroatom or heteroatom-containing group. However, for purposes of this invention and claims thereto in relation to the catalyst compounds described herein, the term "substituted" means that a hydrogen group has been replaced with a hydrocarbyl group, a heteroatom, or a heteroatom-containing group. For example, methyl cyclopentadiene (Cp) is a Cp group substituted with a methyl group.

Unless otherwise noted, all molecular weights units (e.g., $M_w$, $M_n$, $M_z$) are g/mol.

Unless otherwise noted all melting points ($T_m$) are DSC second melt.

The term "aryl," "aryl radical," and/or "aryl group" refers to aromatic cyclic structures, which may be substituted with hydrocarbyl radicals and/or functional groups as defined herein.

As used herein the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The term "continuous" means a system that operates without interruption or cessation. For example, a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng, Chem. Res. 29, 2000, 4627.

A bulk polymerization means a polymerization process in which the monomers and/or comonomers being polymerized are used as a solvent or diluent using little or no inert solvent as a solvent or diluent. A small portion of inert solvent might be used as a carrier for catalyst and scavenger. A bulk polymerization system contains less than 25 wt % of inert solvent or diluent, preferably less than 10 wt %, preferably less than 1 wt %, preferably 0 wt %.

"Catalyst activity" is a measure of how many grams of polymer (P) are produced using a polymerization catalyst comprising W mmol of transition metal (M), over a period of time of T hours; and may be expressed by the following formula: P/(T×W).

For purposes herein, RT is room temperature, which is defined as 25° C. unless otherwise specified. All percentages are weight percent (wt %) unless otherwise specified.

Catalyst Ligands and Compounds

In a first aspect, this invention relates to ligands represented by the formula (A):

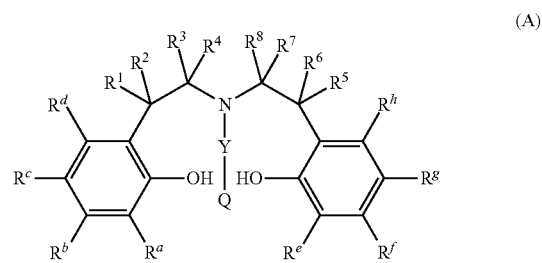

(A)

where Q is a neutral group comprising at least one atom from Group 15 or Group 16 (such as O, N, S, and P);

Y is a divalent $C_1$-$C_{40}$ (alternately $C_1$-$C_{20}$) hydrocarbyl or substituted divalent hydrocarbyl group, and Y can form a substituted or unsubstituted heterocycle with Q which may or may not be aromatic and may or may not have multiple fused rings;

each $R^a$, $R^b$, $R^c$, $R^d$, $R^e$, $R^f$, $R^g$, and $R^h$ is, independently, a hydrogen, a $C_1$-$C_{40}$ hydrocarbyl radical, a $C_1$-$C_{40}$ substituted hydrocarbyl radical, a heteroatom or a heteroatom-containing group, or two or more of $R^a$ to $R^h$ adjacent to each other may independently join together to form a $C_4$-$C_{62}$ cyclic, polycyclic or heterocyclic structure, or a combination thereof, preferably as described below for formula I; and $R^1$, $R^2$, $R^3$, $R^4$, $R^5$, $R^6$, $R^7$, and $R^8$ is, independently, a hydrogen, a $C_1$-$C_{40}$ hydrocarbyl radical, a $C_1$-$C_{40}$ substituted hydrocarbyl radical, a heteroatom or a heteroatom-containing group, or $R^1$ and or $R^2$ may form a $C_4$-$C_{62}$ cyclic or polycyclic ring structure with $R^3$ and or $R^4$, and $R^5$ and or $R^6$ may form a $C_4$-$C_{62}$ cyclic or polycyclic ring structure with $R^7$ and or $R^8$, or a combination thereof.

In another aspect of the invention there is provided a transition metal complex (optionally for use in alkene polymerization) represented by the formula (I):

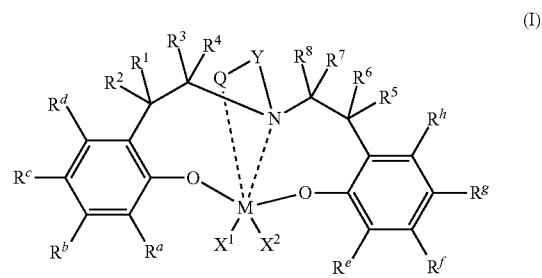

(I)

wherein M is a Group 4 transition metal (preferably Hf, Zr, or Ti, preferably Hf or Zr);

$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure (preferably benzyl, methyl, ethyl, chloro, bromo and the like);

Q is a neutral donor group, preferably a neutral donor group comprising at least one atom from Group 15 or Group 16, preferably comprising O, N, S, or P;

Y is a divalent $C_1$ to $C_{40}$ (alternately $C_1$ to $C_{20}$) hydrocarbyl or substituted divalent hydrocarbyl group;

each $R^a$, $R^b$, $R^c$, $R^d$, $R^e$, $R^f$, $R^g$, and $R^h$ is, independently, a hydrogen, a $C_1$-$C_{40}$ hydrocarbyl radical, a $C_1$-$C_{40}$ substituted hydrocarbyl radical, a heteroatom or a heteroatom-containing group, or two or more of $R^a$ to $R^h$ adjacent to each other may independently join together to form a $C_4$-$C_{62}$ cyclic, polycyclic or heterocyclic structure, or a combination thereof, preferably each $R^a$, $R^b$, $R^c$, $R^d$, $R^e$, $R^f$, $R^g$, and $R^h$ is, independently, a $C_1$-$C_{20}$ hydrocarbyl radical, preferably a $C_1$-$C_{20}$ alkyl or aromatic radical, preferably each $R^a$, $R^b$, $R^c$, $R^d$, $R^e$, $R^f$, $R^g$, and $R^h$ is, independently, selected from the group consisting of hydrogen, methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, adamantyl, substituted adamantyl, cyclohexyl, substituted cyclohexyl, phenyl, substituted phenyl, fluorenyl, substituted fluorenyl, carbazolyl, substituted carbazolyl, naphthyl, substituted naphthyl, phenanthryl, substituted phenanthryl, anthracenyl, substituted anthracenyl, indanyl, substituted indanyl, indenyl, substituted indenyl, pyrenyl, substituted pyrenyl, trifluoromethyl, alkoxy or phenoxy group, substituted alkoxy or phenoxy group, dialkyl- or diphenyl- or alkylphenylamino group, substituted dialkyl- or diphenyl- or alkylphenylamino group, heterocyclic amino group which may or may not be aromatic and or may or may not be polycyclic, substituted heterocyclic amino group which may or may not be aromatic and or may or may not be polycyclic, alkyl- or phenylthio group, substituted alkyl- or phenylthio group, dialkyl- or diphenyl- or alkylphenylphosphino group, substituted dialkyl- or diphenyl- or alkylphenylphosphino group, fluoro, chloro, bromo and iodo; and each $R^1$, $R^2$, $R^3$, $R^4$, $R^5$, $R^6$, $R^7$, and $R^8$ is, independently, a hydrogen, a $C_1$-$C_{40}$ hydrocarbyl radical, a $C_1$-$C_{40}$ substituted hydrocarbyl radical, a heteroatom or a heteroatom-containing group, or $R^1$ and or $R^2$ may form a $C_4$-$C_{62}$ cyclic or polycyclic ring structure with $R^3$ and or $R^4$, and $R^5$ and or $R^6$ may form a $C_4$-$C_{62}$ cyclic or polycyclic ring structure with $R^7$ and or $R^8$, or a combination thereof, preferably, each $R^1$, $R^2$, $R^3$, $R^4$, $R^5$, $R^6$, $R^7$, and $R^8$ is, independently, a $C_1$-$C_{20}$ hydrocarbyl radical, preferably a $C_1$-$C_{20}$ alkyl radical, preferably each $R^1$, $R^2$, $R^3$, $R^4$, $R^5$, $R^6$, $R^7$, and $R^8$ is, independently, selected from the group consisting of hydrogen, methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl.

In another aspect, this invention relates to catalyst compounds represented by the formula (I) where $R^a$ and/or $R^e$ (preferably $R^a$ and $R^e$) are independently a carbazole radical or substituted carbazole radical represented by the formula:

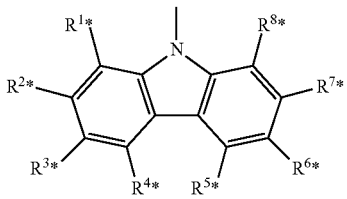

wherein each $R^{1*}$, $R^{2*}$, $R^{3*}$, $R^{4*}$, $R^{5*}$, $R^{6*}$, $R^{7*}$, and $R^{8*}$ is, independently, a hydrogen, a $C_1$-$C_{40}$ hydrocarbyl radical, a functional group comprising elements from Group 13 to 17 of the periodic table of the elements, or two or more of $R^1$ to $R^8$ may independently join together to form a $C_4$ to $C_{62}$ cyclic or polycyclic or heterocyclic ring structure, or a combination thereof, preferably each $R^1$, $R^2$, $R^3$, $R^4$, $R^5$, $R^6$, $R^7$, and $R^8$ is hydrogen, preferably $R^3$ and or $R^6$ is hydrogen, methyl, ethyl, isomers or propyl, butyl, pentyl, hexyl, heptyl, octyl, cyclohexyl, cyclooctyl or adamantyl.

In another aspect, this invention relates to catalyst compounds represented by the formula (I) where $R^a$ and/or $R^e$ (preferably $R^a$ and $R^e$) are independently a fluorenyl radical or substituted fluorenyl radical represented by the formula:

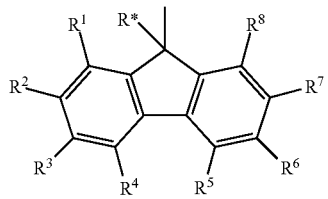

wherein each $R^1$, $R^2$, $R^3$, $R^4$, $R^5$, $R^6$, $R^7$, and $R^8$ is, independently, a hydrogen, a $C_1$-$C_{40}$ hydrocarbyl radical, a functional group comprising elements from Group 13 to 17 of the periodic table of the elements, or two or more of $R^1$ to $R^8$ may independently join together to form a $C_4$ to $C_{62}$ cyclic or polycyclic or heterocyclic ring structure, or a combination thereof; $R^*$ is a hydrogen, a $C_1$-$C_{40}$ hydrocarbyl radical, a substituted $C_1$-$C_{40}$ hydrocarbyl radical (preferably $R^*$ is methyl, phenyl, tolyl, substituted phenyl, or substituted tolyl).

For purposes herein, any hydrocarbyl radical (and any alkyl radical) may be independently selected from methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl.

In any embodiment of the transition metal complexes described herein M may be Hf, Ti or Zr.

In any embodiment of the transition metal complexes described herein, each of $X^1$ and $X^2$ is independently selected from the group consisting of hydrocarbyl radicals having from 1 to 20 carbon atoms (such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl), hydrides, amides, alkoxides having from 1 to 20 carbon atoms, sulfides, phosphides, halides, sulfoxides, sulfonates, phosphonates, nitrates, carboxylates, carbonates and combinations thereof, preferably each of $X^1$ and $X^2$ is independently selected from the group consisting of halides (F, Cl, Br, I), alkyl radicals having from 1 to 7 carbon atoms (methyl, ethyl, propyl, butyl, pentyl, hexyl, heptyl, and isomers thereof), benzyl radicals, or a combination thereof.

In any embodiment of the transition metal complexes described herein, Y is a divalent $C_1$-$C_{40}$ hydrocarbyl radical or divalent substituted hydrocarbyl radical comprising a portion that comprises a linker backbone comprising from 1 to 18 carbon atoms linking or bridging between Q and N. In an embodiment, Y is selected from the group consisting of methylene, (—$CH_2$—), ethylene (—$CH_2CH_2$—) and 1,2-cyclohexylene. In an embodiment, Y is —$CH_2CH_2CH_2$— derived from propylene. In an embodiment, Y is selected from the group consisting of $C_1$ to $C_{20}$ alkyl groups, such as divalent methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl.

In a useful embodiment, each $R^a$, $R^b$, $R^c$, $R^d$, $R^e$, $R^f$, $R^g$, and $R^h$ is, independently, a hydrogen, a $C_1$-$C_{20}$ hydrocarbyl radical, a substituted $C_1$ to $C_{20}$ hydrocarbyl radical, or two or more of $R^1$ to $R^{10}$ adjacent to each other may independently join together to form a $C_4$ to $C_{62}$ cyclic or polycyclic ring structure, or a combination thereof.

In any embodiment of the ligand or transition metal complexes described herein each $R^a$, $R^b$, $R^c$, $R^d$, $R^e$, $R^f$, $R^g$, and $R^h$ is, independently, hydrogen, a halogen, a $C_1$ to $C_{30}$ hydrocarbyl radical, a $C_1$ to $C_{20}$ hydrocarbyl radical, or a $C_1$ to $C_{10}$ hydrocarbyl radical (such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, or eicosyl).

In any embodiment of the ligand or transition metal complexes described herein each $R^a$, $R^b$, $R^c$, $R^d$, $R^e$, $R^f$, $R^g$, and $R^h$ is, independently, a substituted $C_1$ to $C_{30}$ hydrocarbyl radical, a substituted $C_1$ to $C_{20}$ hydrocarbyl radical, or a substituted $C_1$ to $C_{10}$ hydrocarbyl radical (such as 4-fluorophenyl, 4-chlorophenyl, 4-bromophenyl, 4-methoxyphenyl, 4-trifluoromethylphenyl, 4-dimethylaminophenyl, 4-trimethylsilylphenyl, 4-triethylsilylphenyl, trifluoromethyl, fluoromethyl, trichloromethyl, chloromethyl, mesityl, methylthio, phenylthio, (trimethylsilyl)methyl, and (triphenylsilyl) methyl).

In any embodiment of the invention, one or more of $R^a$, $R^b$, $R^c$, $R^d$, $R^e$, $R^f$, $R^g$, and $R^h$ is a methyl radical, a fluoride, chloride, bromide, iodide, methoxy, ethoxy, isopropoxy, trifluoromethyl, dimethylamino, diphenylamino, adamantyl, phenyl, pentafluorophenyl, naphthyl, anthracenyl, dimethylphosphanyl, diisopropylphosphanyl, diphenylphosphanyl, methylthio, and phenylthio or a combination thereof.

In a useful embodiment of the ligand or transition metal complexes described herein $R^a$ and or $R^e$ are the same, preferably $R^a$ and or $R^e$ are C—R''', where each R''' is H or a $C_1$ to $C_{12}$ hydrocarbyl or substituted hydrocarbyl (such as methyl, ethyl, ethenyl and isomers of propyl, butyl, pentyl, hexyl, heptyl, octyl, nonyl, decyl, undecyl, dodecyl, trifluoromethylphenyl, tolyl, phenyl, methoxyphenyl, tertbutylphenyl, fluorophenyl, diphenyl, dimethylaminophenyl, chlorophenyl, bromophenyl, iodophenyl, (trimethylsilyl)phenyl, (triethylsilyl)phenyl, (trimethylsilyl)methyl, (triethylsilyl) methyl). In a useful embodiment of the ligand or transition metal complexes described herein $R^a$ and or $R^e$ are different.

In a useful embodiment of the ligand or transition metal complexes described herein, $R^a$ and or $R^e$ are the same, preferably $R^a$ and or $R^e$ are carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, substituted fluorenyl, naphthyl, substituted naphthyl, anthacenyl, substituted anthracenyl, phenanthryl, and substituted phenanthryl. In a useful embodiment of the ligand or transition metal complexes described herein, $R^a$ and or $R^e$ are the same.

In a useful embodiment, each $R^1$, $R^2$, $R^3$, $R^4$, $R^5$, $R^6$, $R^7$, and $R^8$ is, independently, a hydrogen, a $C_1$-$C_{40}$ hydrocarbyl radical, a $C_1$-$C_{40}$ substituted hydrocarbyl radical, a heteroatom or a heteroatom-containing group, or $R^1$ and or $R^2$ may form a $C_4$-$C_{62}$ cyclic or polycyclic ring structure with $R^3$ and or $R^4$, and $R^5$ and or $R^6$ may form a $C_4$-$C_{62}$ cyclic or polycyclic ring structure with $R^7$ and or $R^8$, or a combination thereof, preferably, each $R^1$, $R^2$, $R^3$, $R^4$, $R^5$, $R^6$, $R^7$, and $R^8$ is, independently, a $C_1$-$C_{20}$ hydrocarbyl radical, preferably a $C_1$-$C_{20}$ alkyl radical, preferably each $R^1$, $R^2$, $R^3$, $R^4$, $R^5$, $R^6$, $R^7$, and $R^8$ is, independently, selected from the group consisting of hydrogen, methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl.

In any embodiment of the transition metal complexes described herein, Q is preferably a neutral donor group comprising at least one atom from Group 15 or Group 16, preferably Q is NR'$_2$, OR', SR', PR'$_2$, where R' is as defined for $R^1$ to $R^8$ above (preferably R' is methyl, ethyl, propyl, isopropyl, phenyl, cyclohexyl or linked together to form a five-membered ring such as pyrrolidinyl or a six-membered ring such as piperidinyl), preferably the -(-Q-Y—)— fragment can form a substituted or unsubstituted heterocycle which may or may not be aromatic and may or may not have multiple fused rings (for example see Catalyst C and Catalyst D in the examples below). In any embodiment of the transition metal complexes described herein, Q is preferably an amine, ether, or pyridine.

Alternately, Q is furanyl, tetrahydrofuranyl, pyridyl, NR'$_2$, OR', SR', PR'$_2$, where R' is, independently, a hydrogen, a $C_1$-$C_{40}$ hydrocarbyl radical, a $C_1$-$C_{40}$ substituted hydrocarbyl radical, a heteroatom or a heteroatom-containing group.

In an embodiment of the invention, M is Zr or Hf; $X^1$ and $X^2$ are benzyl radicals; $R^c$ and $R^g$ are methyl radicals; $R^b$, $R^d$, $R^h$, $R^f$ and $R^1$ through $R^8$ are hydrogen; and Y is ethylene (—$CH_2CH_2$—) or methylene (—$CH_2$—), Q is an N- or O-containing group, $R^a$ and $R^e$ are phenyl, anthracenyl, phenanthryl, carbazolyl or fluorenyl.

In a particularly preferred embodiment of the invention, the catalyst complex is represented by formula:

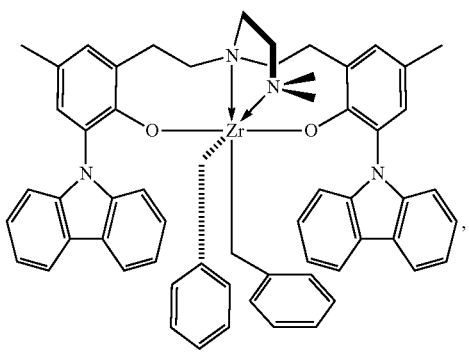

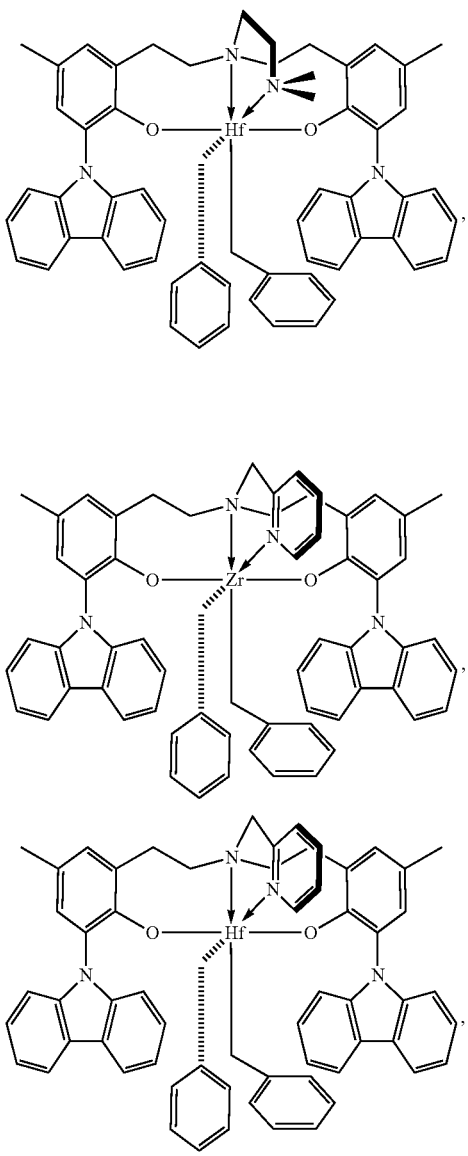

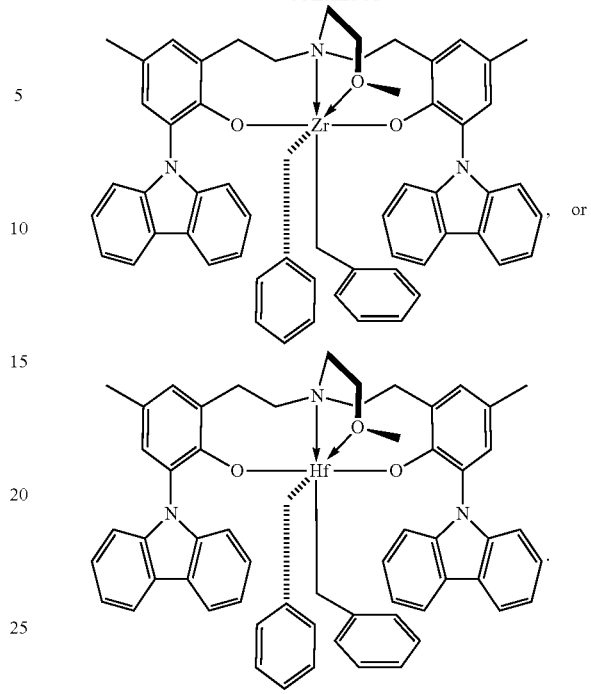

Methods to Prepare the Catalyst Compounds

In general, the transition metal compounds may be prepared by three general synthetic routes. In the first method, the phenol is allylated via a nucleophilic substitution followed by a Claisen rearrangement. The resulting allyl-substituted phenol is then protected and oxidized with ozone to the corresponding aldehyde. Reductive amination of the carbonyl with the amine followed by deprotection results in the final ligand. Alternatively, the aldehyde can be transformed to the corresponding ethyl bromide compound, which is then reacted via nucleophilic substitution with the amine. In the second method, the phenol is ortho-formylated then transformed to the vinyl phenol via a Wittig reaction. The vinyl group is oxidized to the alcohol by hydroboration-oxidation then selectively transformed to the aldehyde or the bromide, which is subsequently reacted as in Method 1 to the final ligand. In the third method, 2-(2-hydroxyphenyl) acetic acid is reduced to corresponding ethyl bromide following a reduction to the alcohol. The ethyl bromide compound is then protected and reacted as in Method 1. The ligand is then typically reacted with the metal tetra-alkyl compound, e.g., tetrabenzyl, to yield the metal dibenzyl complex of the ligand.

Method 1:

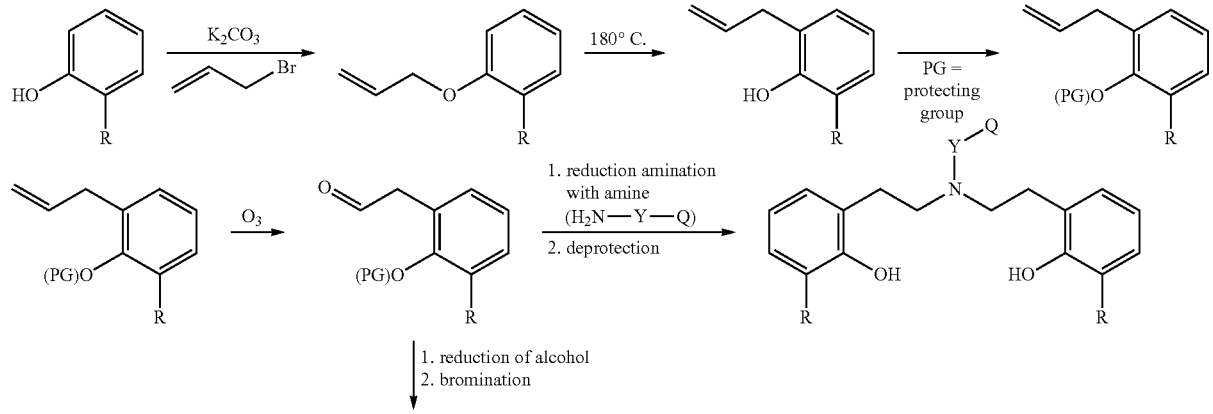

-continued

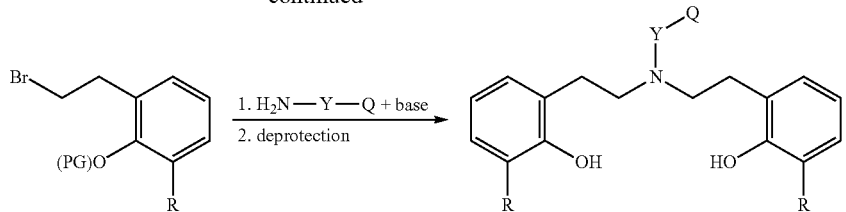

Q = Group 15 or 16 atom-containing group

Method 2:

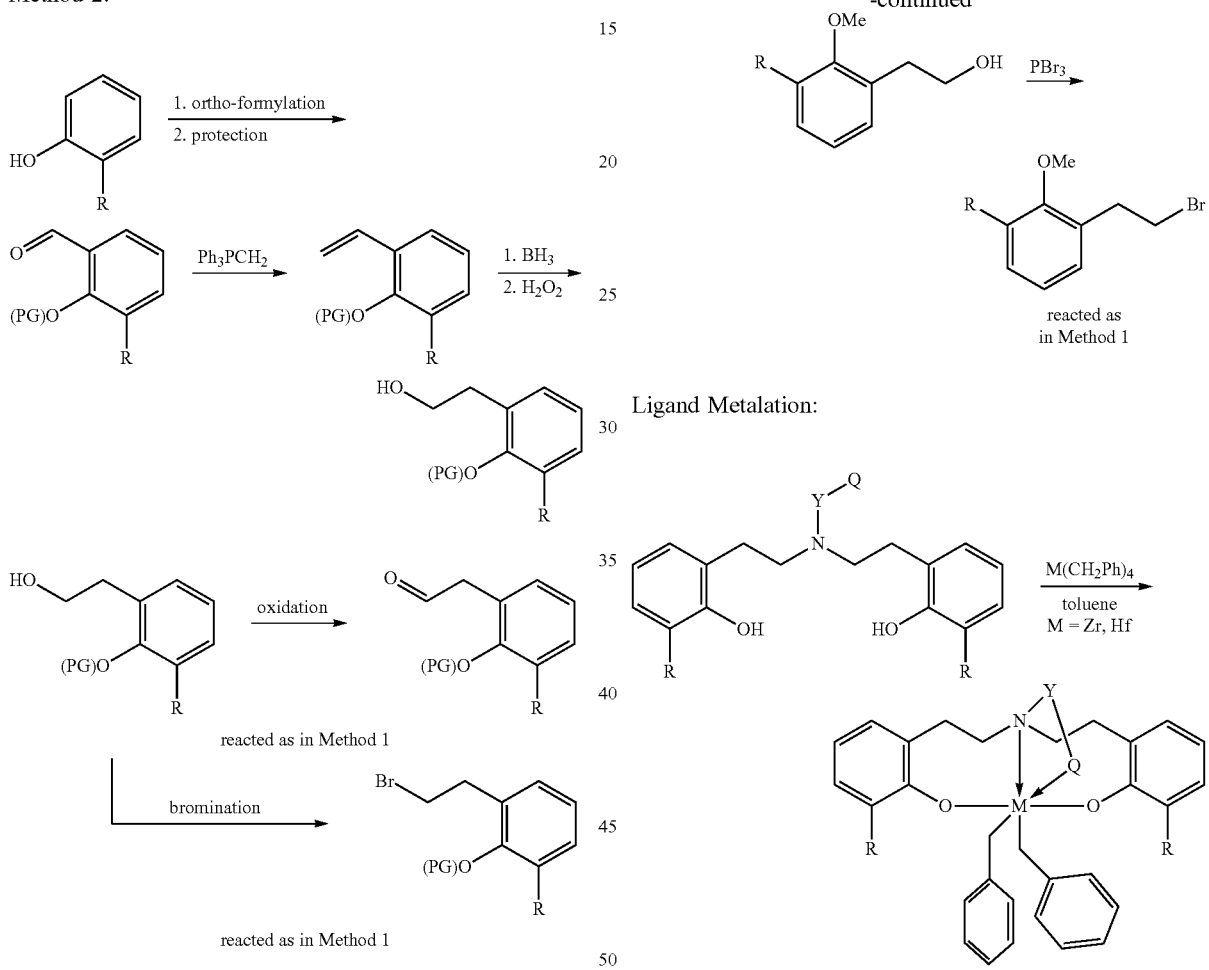

Method 3:

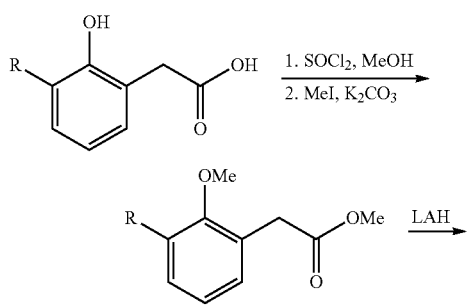

Activators

The terms "cocatalyst" and "activator" are used herein interchangeably and are defined to be any compound which can activate any one of the catalyst compounds described above by converting the neutral catalyst compound to a catalytically active catalyst compound cation.

After the complexes described above have been synthesized, catalyst systems may be formed by combining them with activators in any manner known from the literature including by supporting them for use in slurry or gas phase polymerization. The catalyst systems may also be added to or generated in solution polymerization or bulk polymerization (in the monomer). The catalyst system typically comprises a complex as described above and an activator such as alumoxane or a non-coordinating anion.

Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, G-bound, metal ligand making the metal complex cationic and providing a charge-balancing noncoordinating or weakly coordinating anion.

Alumoxane Activators

In one embodiment, alumoxane activators are utilized as an activator in the catalyst system. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mol %, alternately the alumoxane is present at a molar ratio of aluminum to catalyst compound transition metal less than 500:1, preferably less than 300:1, preferably less than 100:1, preferably less than 1:1.

Non Coordinating Anion Activators

A noncoordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. A stoichiometric activator can be either neutral or ionic. The terms ionic activator, and stoichiometric ionic activator can be used interchangeably. Likewise, the terms neutral stoichiometric activator, and Lewis acid activator can be used interchangeably. The term non-coordinating anion includes neutral stoichiometric activators, ionic stoichiometric activators, ionic activators, and Lewis acid activators.

"Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

The catalyst systems of this invention can include at least one non-coordinating anion (NCA) activator.

In a preferred embodiment boron containing NCA activators represented by the formula below can be used:

where: Z is (L-H) or a reducible Lewis acid; L is a neutral Lewis base; H is hydrogen; (L-H) is a Bronsted acid; $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Most preferably $Z_d^+$ is triphenyl carbonium. Preferred reducible Lewis acids can be any triaryl carbonium (where the aryl can be substituted or unsubstituted, such as those represented by the formula: ($Ar_3C^+$), where Ar is aryl or aryl substituted with a heteroatom, a $C_1$ to $C_{40}$ hydrocarbyl, or a substituted $C_1$ to $C_{40}$ hydrocarbyl), preferably the reducible Lewis acids in formula (14) above as "Z" include those represented by the formula: ($Ph_3C$), where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation (L-H)$_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst are the compounds described as (and particularly those specifically listed as) activators in U.S. Pat. No. 8,658,556, which is incorporated by reference herein.

Most preferably, the ionic stoichiometric activator $Z_d^+$ ($A^{d-}$) is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

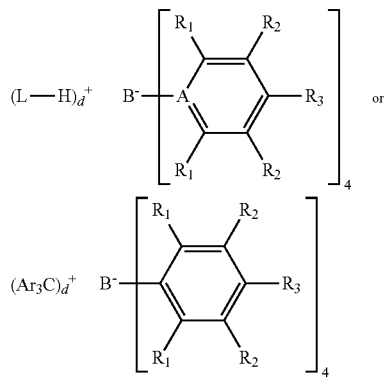

where: each $R_1$ is, independently, a halide, preferably a fluoride;
Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); and
L is a neutral Lewis base; $(L-H)^+$ is a Bronsted acid; d is 1, 2, or 3;
wherein the anion has a molecular weight of greater than 1020 g/mol;
wherein at least three of the substituents on the B atom each have a molecular volume of greater than 250 cubic Å, alternately greater than 300 cubic Å, or alternately greater than 500 cubic Å.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Preferred activators include N,N-dimethylanilinium tetrakis(perfluoronaphthyl)borate, N,N-dimethylanilinium tetrakis(perfluorobiphenyl)borate, bis(hydrogenatedtallow)methylammonium and related long-chain alkylammonium tetra(perfluorophenyl)borate, bis(hydrogenatedtallow)methylammonium and related long-chain alkylammonium tetrakis(perfluoronaphthyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph₃C⁺][B(C₆F₅)₄⁻], [Me₃NH⁺][B(C₆F₅)₄⁻]; 1-(4-(tris(pentafluorophenyl)borate)-2,3,5,6-tetrafluorophenyl)pyrrolidinium; and tetrakis (pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl) ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of this invention that the catalyst compounds can be combined with combinations of alumoxanes and NCA's (see, for example, U.S. Pat. Nos. 5,153,157; 5,453,410; EP 0 573 120; WO 94/07928; and WO 95/14044), which discuss the use of an alumoxane in combination with an ionizing activator).

Scavengers and Co-Activators

The catalyst system may further include scavengers and/or co-activators. In some embodiments, when using the complexes described herein, particularly when they are immobilized on a support, the catalyst system will additionally comprise one or more scavenging compounds. Here, the term scavenging compound means a compound that removes polar impurities from the reaction environment. A scavenger is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound.

Typically, the scavenging compound will be an organometallic compound such as the Group-13 organometallic compounds of U.S. Pat. Nos. 5,153,157; 5,241,025; WO 91/09882; WO 94/03506; WO 93/14132; and that of WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, [Me₂HNPh]⁺[B(pfp)₄]⁻ or B(pfp)₃ (perfluorophenyl=pfp=C₆F₅). In an embodiment, the scavengers are present at less than 14 wt %, or from 0.1 to 10 wt %, or from 0.5 to 7 wt %, by weight of the catalyst system.

Suitable aluminum alkyl or organoaluminum compounds which may be utilized as co-activators include, for example, trimethylaluminum, triethylaluminum, triisobutylaluminum, tri-n-hexylaluminum, tri-n-octylaluminum and the like. In an embodiment, the co-activators are present at less than 14 wt %, or from 0.1 to 10 wt %, or from 0.5 to 7 wt %, by weight of the catalyst system. Alternately, the complex-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Chain Transfer Agents (CTAs)

A "chain transfer agent" is any agent capable of hydrocarbyl and/or polymeryl group exchange between a coordinative polymerization catalyst and the metal center of the chain transfer agent during a polymerization process. The chain transfer agent can be any desirable chemical compound such as those disclosed in WO 2007/130306. Preferably, the chain transfer agent is selected from Group 2, 12, or 13 alkyl or aryl compounds; preferably zinc, magnesium or aluminum alkyls or aryls; preferably where the alkyl is a $C_1$ to $C_{30}$ alkyl, alternately a $C_2$ to $C_{20}$ alkyl, alternately a $C_3$ to $C_{12}$ alkyl, typically selected independently from methyl, ethyl, propyl, butyl, isobutyl, tertbutyl, pentyl, hexyl, cyclohexyl, phenyl, octyl, nonyl, decyl, undecyl, and dodecyl; and where di-ethylzinc is particularly preferred.

In a particularly useful embodiment, this invention relates to a catalyst system comprising activator, catalyst complex as described herein, and chain transfer agent wherein the chain transfer agent is selected from Group 2, 12, or 13 alkyl or aryl compounds.

In a particularly useful embodiment, the chain transfer agent is selected from dialkyl zinc compounds, where the alkyl is selected independently from methyl, ethyl, propyl, butyl, isobutyl, tertbutyl, pentyl, hexyl, cyclohexyl, and phenyl.

In a particularly useful embodiment, the chain transfer agent is selected from trialkyl aluminum compounds, where the alkyl is selected independently from methyl, ethyl, propyl, butyl, isobutyl, tertbutyl, pentyl, hexyl, and cyclohexyl.

In a particularly useful embodiment, the chain transfer agent is selected from tri aryl aluminum compounds where the aryl is selected from phenyl and substituted phenyl.

The inventive process may be characterized by the transfer of at least 0.5 polymer chains (preferably 0.5 to 3) polymer chains, where n is the maximum number of polymer chains that can be transferred to the chain transfer agent metal, preferably n is 1 to 3 for trivalent metals (such as Al) and 1 to 2 for divalent metals (such as Zn), preferably n is 1.5 to 3 for trivalent metals (such as Al) and 1.5-2 for divalent metals (such as Zn). The number of chains transferred per metal is the slope of the plot of moles of polymer produced versus the moles of the chain transfer agent metal (as determined from at least four points, CTA metal:catalyst transition metal of 20:1, 80:1, 140:1 and 200:1, using least squares fit (Microsoft™ Excel 2010, version 14.0.7113.5000 (32 bit)) to draw the line. For example, in Table 10, for entries 1-8, the slope is 0.0682 and for entries 17-24, the slope is 0.7593.

Useful chain transfer agents are typically present at from 10 or 20 or 50 or 100 equivalents to 600 or 700 or 800 or 1000 or 2000 or 4000 equivalents relative to the catalyst component. Alternately the chain transfer agent is preset at a catalyst complex-to-CTA molar ratio of from about 1:12,000 to 10:1; alternatively 1:6,000; alternatively, 1:3,000 to 10:1; alternatively 1:2,000 to 10:1; alternatively 1:1,000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1.

Useful chain transfer agents include diethylzinc, tri-n-octyl aluminum, trimethylaluminum, triethylaluminum, tri-isobutylaluminum, tri-n-hexylaluminum, diethyl aluminum chloride, dibutyl zinc, di-n-propylzinc, di-n-hexylzinc, di-n-pentylzinc, di-n-decylzinc, di-n-dodecylzinc, di-n-tetradecylzinc, di-n-hexadecylzinc, di-n-octadecylzinc, diphenylzinc, diisobutylaluminum hydride, diethylaluminum hydride, di-n-octylaluminum hydride, dibutylmagnesium, diethylmagnesium, dihexylmagnesium, and triethylboron.

In a preferred embodiment, two or more complexes are combined with diethyl zinc and/or tri-n-octylaluminum in the same reactor with monomer(s). Alternately, one or more complexes is/are combined with another catalyst (such as a metallocene) and diethyl zinc and/or tri-n-octylaluminum in the same reactor with monomer(s).

In a preferred embodiment, one or more complexes is/are combined with a mixture of diethyl zinc and an aluminum reagent in the same reactor with monomer(s). Alternately, one or more complexes is/are combined with two chain transfer agents in the same reactor with monomer(s).

Supports

In some embodiments, the complexes described herein may be supported (with or without an activator) by any method effective to support other coordination catalyst systems, effectively meaning that the catalyst so prepared can be used for oligomerizing or polymerizing olefin in a heterogeneous process. The catalyst precursor, activator, co-activator, if needed, suitable solvent, and support may be added in any order or simultaneously.

Typically, the complex and activator may be combined in solvent to form a solution. Then the support is added, and the mixture is stirred for 1 minute to 10 hours. The total solution volume may be greater than the pore volume of the support, but some embodiments limit the total solution volume below that needed to form a gel or slurry (about 90% to 400%, preferably about 100-200% of the pore volume). After stirring, the residual solvent is removed under vacuum, typically at ambient temperature and over 10-16 hours. But greater or lesser times and temperatures are possible.

The complex may also be supported absent the activator; in that case, the activator (and co-activator if needed) is added to a polymerization process's liquid phase. Additionally, two or more different complexes may be placed on the same support. Likewise, two or more activators or an activator and co-activator may be placed on the same support.

Suitable solid particle supports are typically comprised of polymeric or refractory oxide materials, each being preferably porous. Preferably, any support material that has an average particle size greater than 10 µm is suitable for use in this invention. Various embodiments select a porous support material, such as for example, talc, inorganic oxides, inorganic chlorides, for example, magnesium chloride and resinous support materials such as polystyrene polyolefin or polymeric compounds or any other organic support material and the like. Some embodiments select inorganic oxide materials as the support material including Group-2, -3, -4, -5, -13, or -14 metal or metalloid oxides. Some embodiments select the catalyst support materials to include silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can, optionally, double as the activator component, however, an additional activator may also be used.

The support material may be pretreated by any number of methods. For example, inorganic oxides may be calcined, chemically treated with dehydroxylating agents, such as aluminum alkyls and the like, or both.

As stated above, polymeric carriers will also be suitable in accordance with the invention, see for example the descriptions in WO 95/15815 and U.S. Pat. No. 5,427,991. The methods disclosed may be used with the catalyst complexes, activators or catalyst systems of this invention to adsorb or absorb them on the polymeric supports, particularly if made up of porous particles, or may be chemically bound through functional groups bound to or in the polymer chains.

Useful supports typically have a surface area of from 10-700 m$^2$/g, a pore volume of 0.1-4.0 cc/g and an average particle size of 10-500 µm. Some embodiments select a surface area of 50-500 m$^2$/g, a pore volume of 0.5-3.5 cc/g, or an average particle size of 10-200 µm. Other embodiments select a surface area of 100-400 m$^2$/g, a pore volume of 0.8-3.0 cc/g, and an average particle size of 50-100 µm. Useful supports typically have a pore size of 10-1000 Angstroms, alternatively 50-500 Angstroms, or 75-350 Angstroms.

The catalyst complexes described herein are generally deposited on the support at a loading level of 10-100 micromoles of complex per gram of solid support; alternately 20-80 micromoles of complex per gram of solid support; or 40-60 micromoles of complex per gram of support. But greater or lesser values may be used provided that the total amount of solid complex does not exceed the support's pore volume.

Polymerization

Inventive catalyst complexes are useful in polymerizing unsaturated monomers conventionally known to undergo metallocene-catalyzed polymerization such as solution, slurry, gas-phase, and high-pressure polymerization. Typically one or more of the complexes described herein, one or more activators, and one or more monomers are contacted to produce polymer. In certain embodiments, the complexes may be supported and as such will be particularly useful in the known, fixed-bed, moving-bed, fluid-bed, slurry, solution, or bulk operating modes conducted in single, series, or parallel reactors.

One or more reactors in series or in parallel may be used in the present invention. The complexes, activator and when required, co-activator, may be delivered as a solution or slurry, either separately to the reactor, activated in-line just prior to the reactor, or preactivated and pumped as an activated solution or slurry to the reactor. Polymerizations are carried out in either single reactor operation, in which monomer, comonomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors. In one preferred embodiment, the complex is activated in the reactor in the presence of olefin.

In a particularly preferred embodiment, the polymerization process is a continuous process.

Polymerization processes used herein typically comprise contacting one or more alkene monomers with the complexes (and, optionally, activator) described herein. For purpose of this invention alkenes are defined to include multi-alkenes (such as dialkenes) and alkenes having just one double bond. Polymerization may be homogeneous (solution or bulk polymerization) or heterogeneous (slurry—in a liquid diluent, or gas phase—in a gaseous diluent). In the case of heterogeneous slurry or gas phase polymerization, the complex and activator may be supported. Silica is useful as a support herein. Chain transfer agents may also be used herein.

The present polymerization processes may be conducted under conditions preferably including a temperature of about 30° C. to about 200° C., preferably from 60° C. to 195° C., preferably from 75° C. to 190° C. The process may be conducted at a pressure of from 0.05 MPa to 1500 MPa. In a preferred embodiment, the pressure is between 1.7 MPa and 30 MPa, or in another embodiment, especially under supercritical conditions, the pressure is between 15 MPa and 1500 MPa.

Monomers

Monomers useful herein include olefins having from 2 to 20 carbon atoms, alternately 2 to 12 carbon atoms (preferably ethylene, propylene, butylene, pentene, hexene, heptene, octene, nonene, decene, and dodecene) and, optionally, also polyenes (such as dienes). Particularly preferred monomers include ethylene, and mixtures of $C_2$ to $C_{10}$ alpha olefins, such as ethylene-propylene, ethylene-hexene, ethylene-octene, propylene-hexene, and the like.

The complexes described herein are also particularly effective for the polymerization of ethylene, either alone or in combination with at least one other olefinically unsaturated monomer, such as a $C_3$ to $C_{20}$ α-olefin, and particularly a $C_3$ to $C_{12}$ α-olefin. Likewise, the present complexes are also particularly effective for the polymerization of propylene, either alone or in combination with at least one other olefinically unsaturated monomer, such as ethylene or a $C_4$ to $C_{20}$ α-olefin, and particularly a $C_4$ to $C_{20}$ α-olefin. Examples of preferred α-olefins include ethylene, propylene, butene-1, pentene-1, hexene-1, heptene-1, octene-1, nonene-1, decene-1, dodecene-1, 4-methylpentene-1, 3-methylpentene-1, 3,5,5-trimethylhexene-1, and 5-ethylnonene-1.

In some embodiments, the monomer mixture may also comprise one or more dienes at up to 10 wt %, such as from 0.00001 to 1.0 wt %, for example, from 0.002 to 0.5 wt %, such as from 0.003 to 0.2 wt %, based upon the monomer mixture. Non-limiting examples of useful dienes include, cyclopentadiene, norbornadiene, dicyclopentadiene, 5-ethylidene-2-norbornene ("ENB"), 5-vinyl-2-norbornene, 1,4-hexadiene, 1,5-hexadiene, 1,5-heptadiene, 1,6-heptadiene, 6-methyl-1,6-heptadiene, 1,7-octadiene, 7-methyl-1,7-octadiene, 1,9-decadiene, 1 and 9-methyl-1,9-decadiene.

In a useful embodiment of the invention, the monomers comprise: 1) ethylene; 2) one or more $C_3$ to $C_{12}$ alkenes, such as propylene, hexene and/or octene; and 3) one or more dienes, preferably 5-ethylidene-2-norbornene, 5-vinyl-2-norbornene, 1,5-hexadiene, and the like.

Particularly preferred monomers combinations include: ethylene-propylene-ENB, ethylene-hexene-ENB, ethylene-octene-ENB, and the like.

Where olefins are used that give rise to short chain branching, such as propylene, the catalyst systems may, under appropriate conditions, generate stereoregular polymers or polymers having stereoregular sequences in the polymer chains.

Polymer Products

The homopolymer and copolymer products produced by the present process may have an Mw of about 1,000 to about 2,000,000 g/mol, alternately of about 30,000 to about 600,000 g/mol, or alternately of about 100,000 to about 500,000 g/mol, as determined by GPC. Preferred polymers produced here may be homopolymers or copolymers. In a preferred embodiment, the comonomer(s) are present at up to 50 mol %, preferably from 0.01 to 40 mol %, preferably 1 to 30 mol %, preferably from 5 to 20 mol %. In some embodiments herein, a multimodal polyolefin composition is produced, comprising a first polyolefin component and at least another polyolefin component, different from the first polyolefin component by molecular weight, preferably such that the GPC trace has more than one peak or inflection point.

Unless otherwise indicated, measurements of weight average molecular weight (Mw), number average molecular weight (Mn), and z average molecular weight (Mz) are determined by the GPC-SEC procedure as described below in the Experimental section.

In a preferred embodiment, the homopolymer and copolymer products produced by the present process may have an Mw of about 1,000 to about 2,000,000 g/mol, alternately of about 30,000 to about 600,000 g/mol, or alternately of about 100,000 to about 500,000 g/mol, as determined by GPC-SEC.

In an alternate embodiment, the homopolymer and copolymer products produced by the present process may have a multi-modal, such as bimodal, Mw/Mn.

The term "multimodal," when used to describe a polymer or polymer composition, means "multimodal molecular weight distribution," which is understood to mean that the Gel Permeation Chromatography (GPC-SEC) trace, plotted as Absorbance versus Retention Time (seconds), has more than one peak or inflection point. An "inflection point" is that point where the second derivative of the curve changes in sign (e.g., from negative to positive or vice versa). For example, a polyolefin composition that includes a first lower molecular weight polymer component (such as a polymer having an Mw of 100,000 g/mol) and a second higher molecular weight polymer component (such as a polymer having an Mw of 300,000 g/mol) is considered to be a "bimodal" polyolefin composition.

In an alternate embodiment, the polymer produced herein has an Mw/Mn of from 1 to 40, alternately from greater than 1 to 5.

End Uses

Articles made using polymers produced herein may include, for example, molded articles (such as containers and bottles, e.g., household containers, industrial chemical containers, personal care bottles, medical containers, fuel tanks, and storageware, toys, sheets, pipes, tubing) films, non-wovens, and the like. It should be appreciated that the list of applications above is merely exemplary, and is not intended to be limiting.

This invention further relates to:

1. A ligand represented by the formula (A):

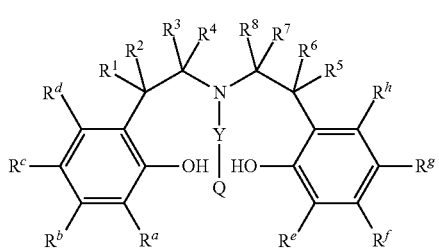

where Q is a neutral group comprising at least one atom from Group 15 or Group 16;

Y is a divalent $C_1$-$C_{40}$ hydrocarbyl or substituted divalent hydrocarbyl group, and Y can form a substituted or unsubstituted heterocycle with Q which may or may not be aromatic and may have multiple fused rings;

each $R^a$, $R^b$, $R^c$, $R^d$, $R^e$, $R^f$, $R^g$, and $R^h$ is, independently, a hydrogen, a $C_1$-$C_{40}$ hydrocarbyl radical, a $C_1$-$C_{40}$ substituted hydrocarbyl radical, a heteroatom or a heteroatom-containing group, or two or more of $R^a$ to $R^h$ adjacent to each other may independently join together to form a $C_4$-$C_{62}$ cyclic, polycyclic or heterocyclic structure, or a combination thereof; and $R^1$, $R^2$, $R^3$, $R^4$, $R^5$, $R^6$, $R^7$, and $R^8$ is, independently, a hydrogen, a $C_1$-$C_{40}$ hydrocarbyl radical, a $C_1$-$C_{40}$ substituted hydrocarbyl radical, a heteroatom or a heteroatom-containing group, or $R^1$ and or $R^2$ may form a $C_4$-$C_{62}$ cyclic or polycyclic ring structure with $R^3$ and or $R^4$, and $R^5$ and or $R^6$ may form a $C_4$-$C_{62}$ cyclic or polycyclic ring structure with $R^7$ and or $R^8$, or a combination thereof.

2. The ligand of embodiment 1, wherein Y is a $C_1$ to $C_{20}$ alkyl group.

3. The ligand of embodiment 1, wherein $R^e$ and $R^a$ are independently a carbazole or substituted carbazole.

4. The ligand of embodiment 1, wherein $R^c$ and $R^5$ are independently a $C_1$ to $C_{20}$ alkyl group.

5. A transition metal complex represented by the formula (I):

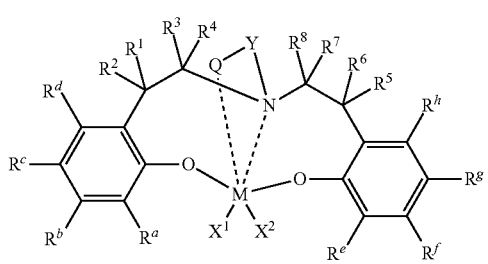

wherein M is a Group 4 transition metal;

$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;

Q is a neutral donor group;

Y is a divalent $C_1$-$C_{40}$ hydrocarbyl or substituted divalent hydrocarbyl group, and Y can form a substituted or unsubstituted heterocycle with Q which may or may not be aromatic and may or may not have multiple fused rings;

each $R^a$, $R^b$, $R^c$, $R^d$, $R^e$, $R^f$, $R^g$, and $R^h$ is, independently, a hydrogen, a $C_1$-$C_{40}$ hydrocarbyl radical, a $C_1$-$C_{40}$ substituted hydrocarbyl radical, a heteroatom or a heteroatom-containing group, or two or more of $R^a$ to $R^h$ adjacent to each other may independently join together to form a $C_4$-$C_{62}$ cyclic, polycyclic or heterocyclic structure, or a combination thereof; and $R^1$, $R^2$, $R^3$, $R^4$, $R^5$, $R^6$, $R^7$, and $R^8$ is, independently, a hydrogen, a $C_1$-$C_{40}$ hydrocarbyl radical, a $C_1$-$C_{40}$ substituted hydrocarbyl radical, a heteroatom or a heteroatom-containing group, or $R^1$ and or $R^2$ may form a $C_4$-$C_{62}$ cyclic or polycyclic ring structure with $R^3$ and or $R^4$, and $R^5$ and or $R^6$ may form a $C_4$-$C_{62}$ cyclic or polycyclic ring structure with $R^7$ and or $R^8$, or a combination thereof.

6. The transition metal complex of embodiment 5, wherein M is Hf or Zr or Ti.

7. The ligand or transition metal complex of embodiment 2, wherein $R^a$ and $R^e$ are carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, substituted fluorenyl, phenyl, substituted phenyl, naphthyl substituted naphthyl, anthracenyl, substituted anthracenyl, phenanthryl, substituted phenanthryl, pyrenyl, substituted pyrenyl, cyclohexyl, substituted cyclohexyl, adamantyl, substituted adamantyl, methyl, ethyl, or isomers of propyl, butyl, pentyl and hexyl.

8. The ligand or transition metal complex of any of embodiments 1 to 4, wherein Q is a neutral donor group comprising at least one atom from Group 15 or Group 16 and the -(-Q-Y—)— fragment can form a substituted or unsubstituted heterocycle which may or may not be aromatic and may have multiple fused rings.

9. The transition metal complex of embodiment 5, wherein Q comprises O, N, S, or P.

10. The transition metal complex of embodiment 5, wherein Q is furanyl, tetrahydrofuranyl, pyridyl, $NR'_2$, OR', SR', $PR'_2$, where R' is as defined for $R^a$.

11. The transition metal complex of embodiment 5, wherein $R^a$ and $R^e$ are the same.

12. The transition metal complex of embodiment 5, wherein the catalyst complex is represented by formula:

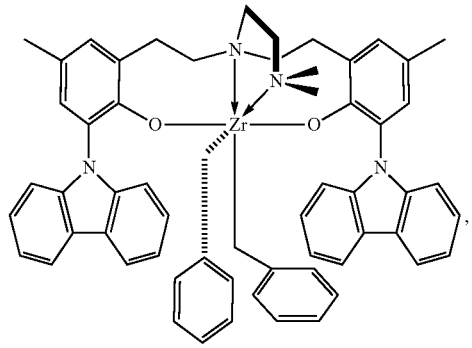

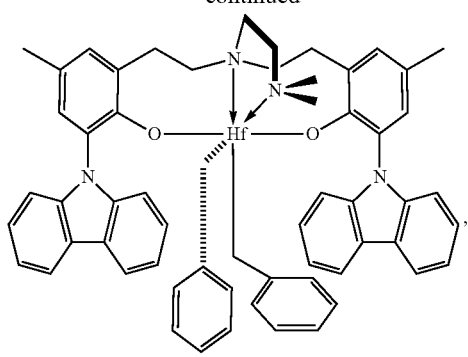

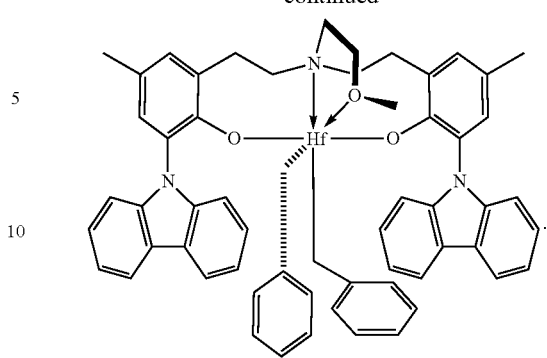

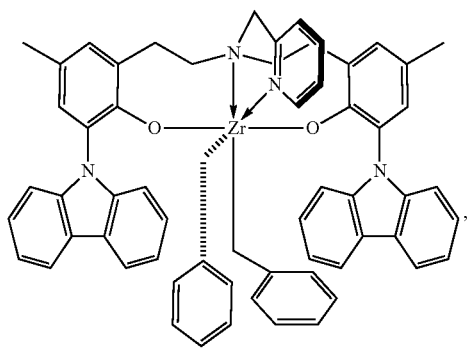

13. A catalyst system comprising activator and the complex of embodiment 5.

14. The catalyst system of embodiment 13, wherein $R^a$ and $R^e$ are, independently, carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, substituted fluorenyl, phenyl, substituted phenyl, naphthyl substituted naphthyl, anthracenyl, substituted anthracenyl, phenanthryl, substituted phenanthryl, pyrenyl, substituted pyrenyl, cyclohexyl, substituted cyclohexyl, adamantyl, substituted adamantyl, methyl, ethyl, or isomers of propyl, butyl, pentyl and hexyl.

15. The catalyst system of embodiment 13, wherein the catalyst complex is represented by formula:

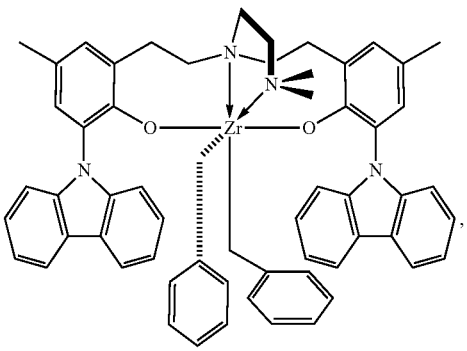

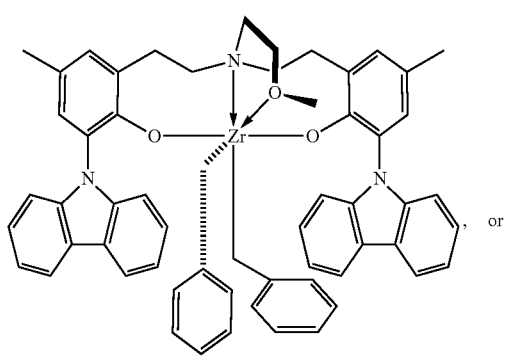

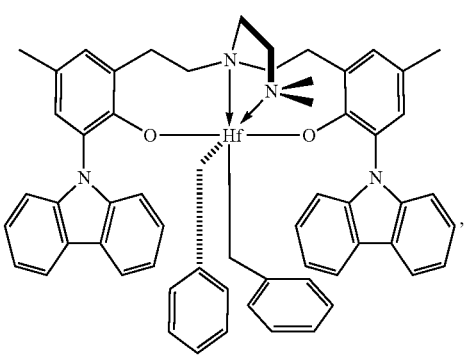

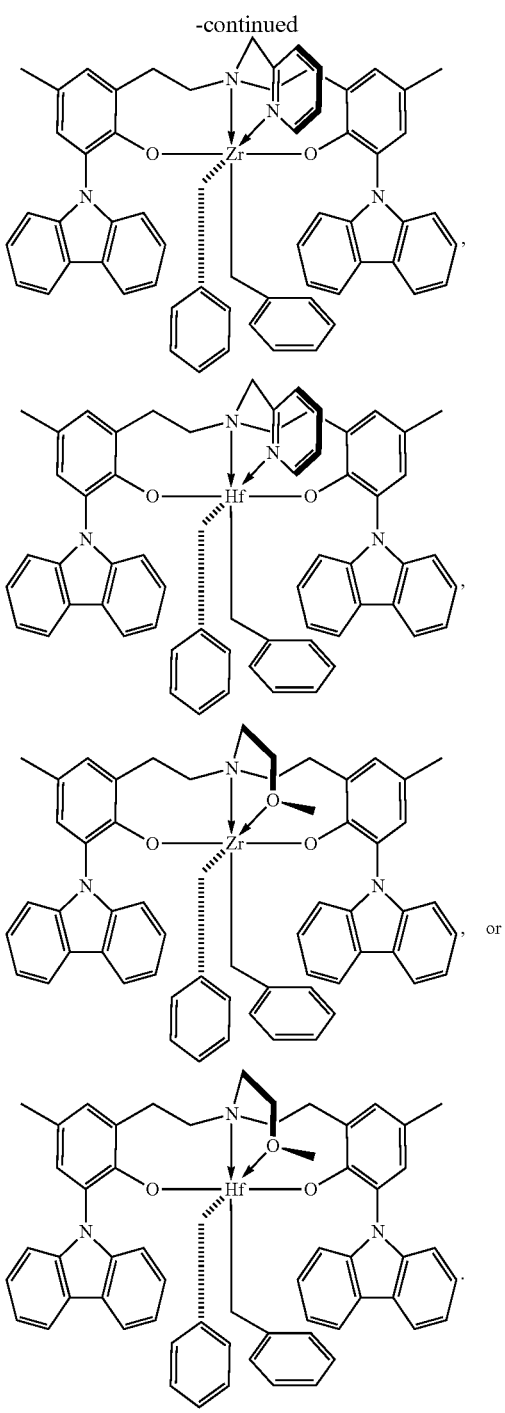

16. The catalyst system of embodiment 13, wherein $R^a$ and $R^e$ are the same.

17. The catalyst system of embodiment 13, wherein the catalyst system further comprises chain transfer agent.

18. The catalyst system of embodiment 13, wherein the catalyst system further comprises chain transfer agent represented by the formula $R_3Al$ or $R_2Zn$, where R is a $C_1$ to $C_{20}$ alkyl group.

19. The catalyst system of embodiment 13, wherein the activator is an alumoxane.

20. The catalyst system of embodiment 13, wherein the activator is a non-coordinating anion.

21. The catalyst system of embodiment 13, wherein the activator is selected from the group consisting of: methylalumoxane, ethylalumoxane, isobutyl alumoxane, N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetra(perfluorophenyl)borate, triphenylcarbenium tetrakis(perfluorophenyl)borate, 1-(4-(tris(pentafluorophenyl)borate)-2,3,5,6-tetrafluorophenyl)pyrrolidinium, tetrakis(pentafluorophenyl)borate, 4-(tris(pentafluorophenyl)borate)-2,3,5,6-tetrafluoropyridine, bis(hydrogenatedtallow)methylammonium and related long-chain alkylammonium tetra(perfluorophenyl)borate, and bis(hydrogenatedtallow)methylammonium and related long-chain alkylammonium tetrakis(perfluoronaphthyl)borate.

22. A polymerization process to produce polyolefin comprising: a) contacting one or more olefin monomers with the catalyst system of embodiment 11, and b) obtaining olefin polymer.

23. The polymerization process of embodiment 22, wherein $R^a$ and $R^e$ are, independently, carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, substituted fluorenyl, phenyl, substituted phenyl, naphthyl substituted naphthyl, anthracenyl, substituted anthracenyl, phenanthryl, substituted phenanthryl, pyrenyl, substituted pyrenyl, cyclohexyl, substituted cyclohexyl, adamantyl, substituted adamantyl, methyl, ethyl, or isomers of propyl, butyl, pentyl and hexyl.

24. The polymerization process of embodiment 22, wherein the catalyst complex is represented by formula:

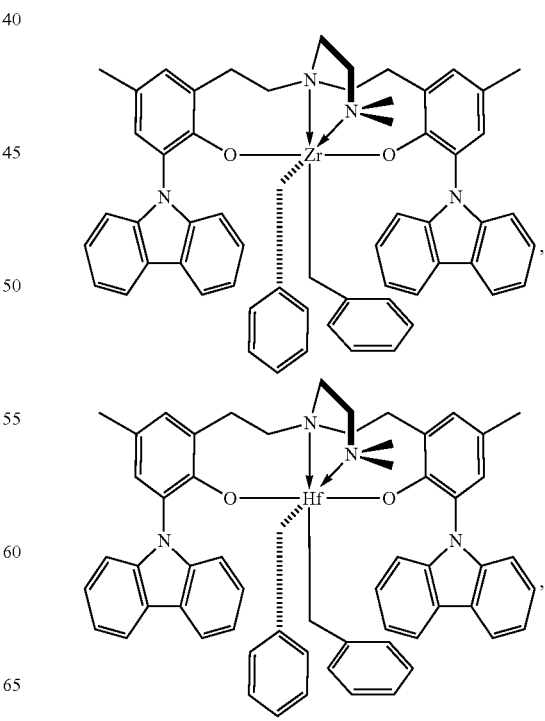

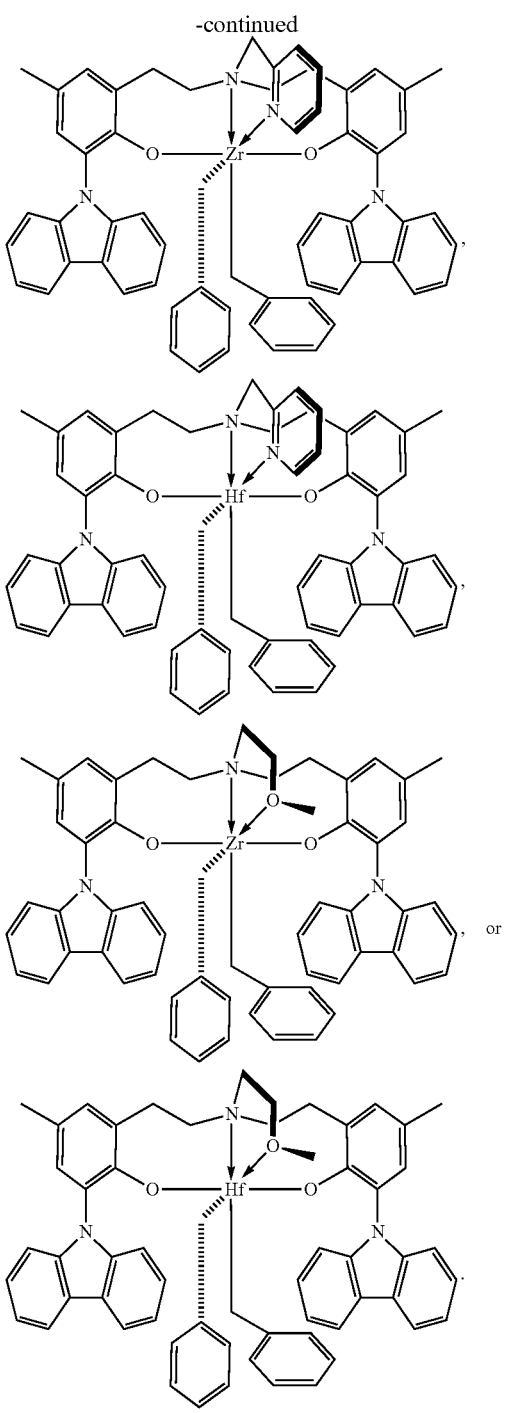

25. The polymerization process of embodiment 22, wherein $R^a$ and $R^e$ are the same.
26. The polymerization process of embodiment 22, wherein the catalyst system further comprises chain transfer agent.
27. The polymerization process of embodiment 22, wherein the catalyst system further comprises chain transfer agent represented by the formula $R_3Al$ or $R_2Zn$, where R is a $C_1$ to $C_{20}$ alkyl group.
28. The process of embodiment 22, wherein the activator is an alumoxane or a non-coordinating anion.
29. The process of embodiment 22, wherein the activator is selected from the group consisting of: methylalumoxane, ethylalumoxane, isobutyl alumoxane, N,N-dimethyl-anilinium tetra(perfluorophenyl)borate, N,N-dimethyl-anilinium tetrakis(perfluoronaphthyl)borate, N,N-dimethyl-anilinium tetrakis(perfluorobiphenyl)borate, N,N-dimethylanilinium tetrakis(3,5-bis(trifluoromethyl)phenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate, triphenylcarbenium tetra(perfluorophenyl) borate, triphenylcarbenium tetrakis(perfluorophenyl)borate, 1-(4-(tris(pentafluorophenyl)borate)-2,3,5,6-tetrafluorophenyl)pyrrolidinium, tetrakis(pentafluorophenyl)borate, 4-(tris(pentafluorophenyl)borate)-2,3,5,6-tetrafluoropyridine, bis(hydrogenatedtallow)methylammonium and related long-chain alkylammonium tetra(perfluorophenyl)borate, and bis(hydrogenatedtallow)methylammonium and related long-chain alkylammonium tetrakis(perfluoronaphthyl)borate.
30. The process of embodiment 22, wherein the monomer comprises ethylene.
31. The process of embodiment 22, wherein the monomer comprises propylene.
32. The process of embodiment 22, wherein the transition metal complex is supported.
33. The process of embodiment 22, wherein chain transfer agent is present.
34. The process of embodiment 22, wherein chain transfer agent represented by the formula $R_3Al$ or $R_2Zn$ is present at a molar ratio of transition metal to Al and Zn of at least 10:1, where R is a $C_1$ to $C_{40}$ alkyl group.
35. The process of embodiment 22, wherein chain transfer agent represented by the formula $R_3Al$ and chain transfer agent represented by the formula $R_2Zn$ are present at a molar ratio of transition metal to Al and Zn of at least 100:1, where R is a $C_1$ to $C_{20}$ alkyl group.
36. The process of embodiment 22, wherein the process is a continuous process.
37. The process of embodiment 22, wherein step a) occurs at a temperature of at least 80° C.
38. The process of embodiment 22, wherein step a) occurs at a temperature of at least 110° C.
39. The process of embodiment 22, wherein hydrogen is present in step a).
40. The process of embodiment 22, wherein hydrogen and chain transfer agent are present in step a).

Experimental

N,N-dimethyl anilinium tetrakis-pentafluorophenyl borate is Activator-1-Methylalumoxane (30 wt % toluene solution) is Activator-2.
Catalysts:

Catalyst A

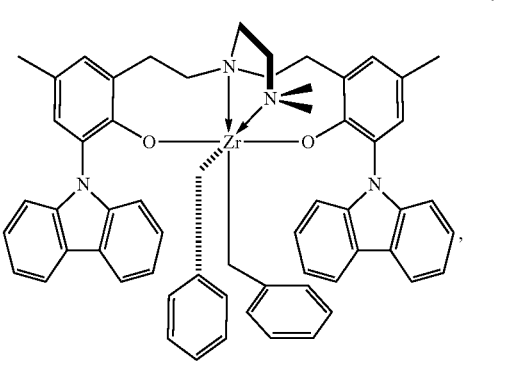

Catalyst B
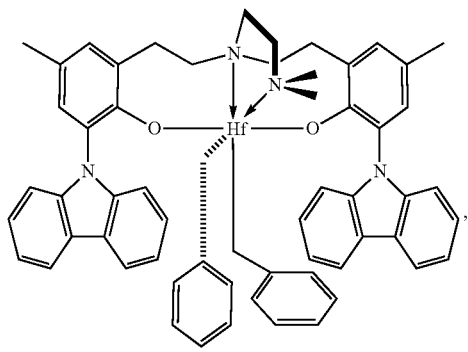
Catalyst C
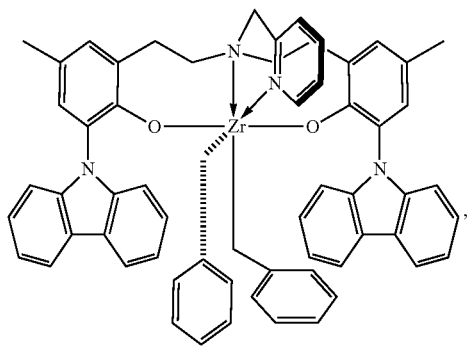
Catalyst D
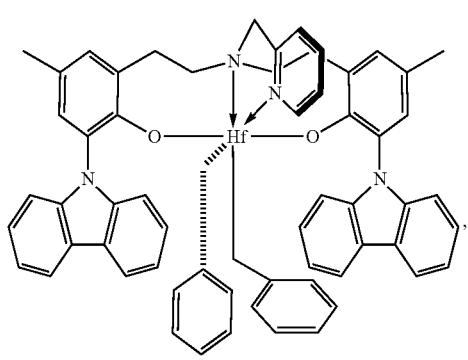
Catalyst E
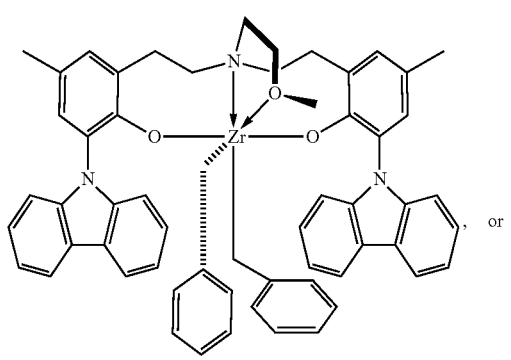, or
Catalyst F
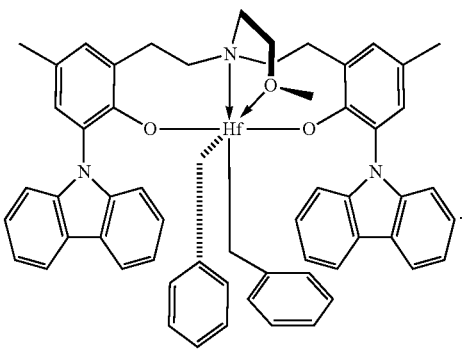
The inventive catalysts above were synthesized according to the following description:
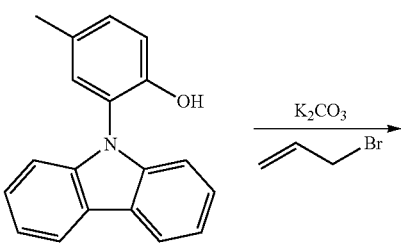
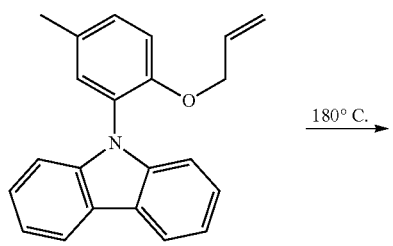
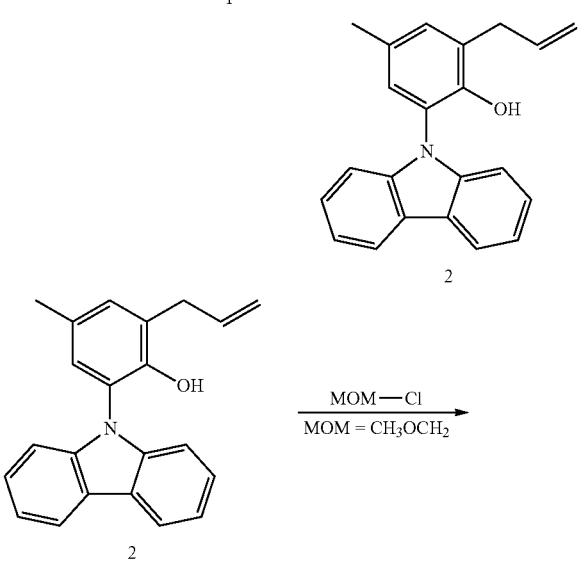

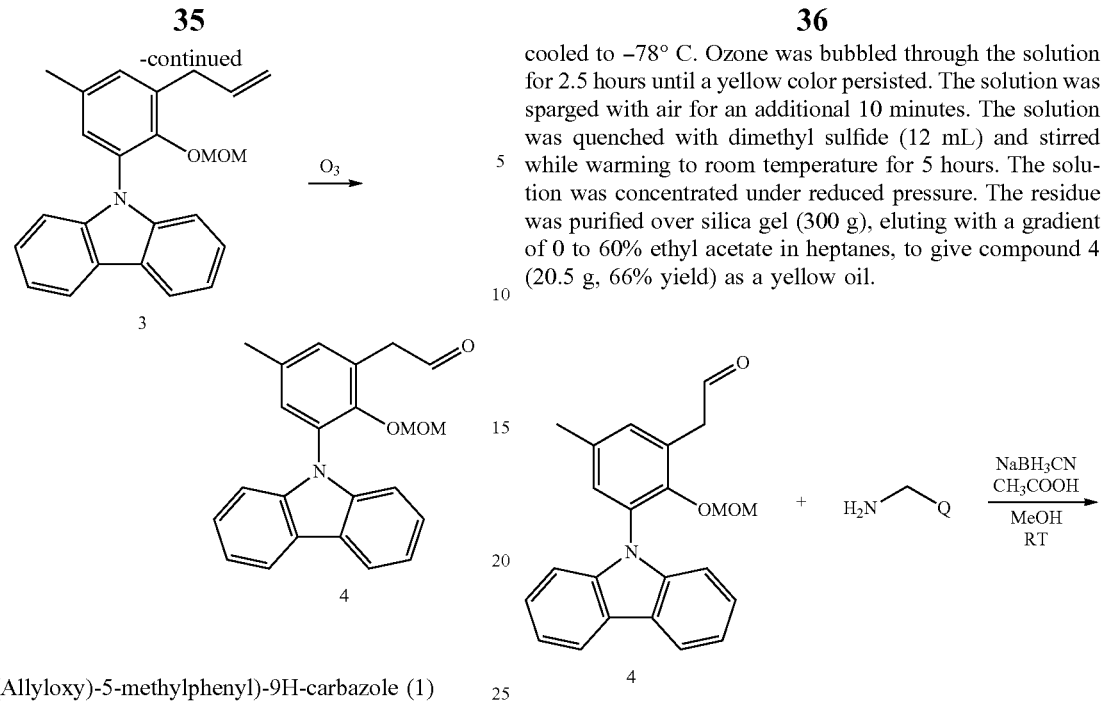

9-(2-(Allyloxy)-5-methylphenyl)-9H-carbazole (1)

Allyl bromide (19 mL, 220 mmol, 1.2 equiv) was added to a solution of compound 2-(9H-carbazol-9-yl)-4-methylphenol (50.0 g, 183 mmol, 1 equiv) and anhydrous potassium carbonate (50.6 g, 366 mmol, 2 equiv) in acetone (1 L). After refluxing overnight, the reaction was cooled to room temperature, and filtered, washing the filter cake with acetone (500 mL). The filtrate was concentrated under reduced pressure to give compound 1 (53.6 g, 94% yield) as an off white solid which was used subsequently.

2-Allyl-6-(9H-carbazol-9-yl)-4-methylphenol (2)

Compound 1 (53.6 g, 171 mmol, 1 equiv) was dissolved in 1,2-dichlorobenzene (186 mL) in a 500 mL sealed glass pressure vessel and heated to 180° C. for 6 days. The solution was purified over silica gel (1 kg) eluting with a gradient of 0 to 50% toluene in heptanes to give compound 2 (47.4 g, 88% yield) as a tan oil that slowly solidified.

9-(3-Allyl-2-(methoxymethoxy)-5-methylphenyl)-9H-carbazole (3)

Compound 2 (45.4 g, 145 mmol, 1 equiv), chloromethyl methyl ether (MOM-Cl, 22 mL, 290 mmol, 2 equiv) and N,N-diisopropylethylamine (50.6 mL, 290 mmol, 2 equiv) were dissolved in dichloromethane (450 mL) and refluxed for 6.5 hours. The solution was diluted with water (400 mL) and the layers were separated. The aqueous layer was extracted with dichloromethane (100 mL). The combined organic layers were concentrated under reduced pressure. The residue was partially purified over silica gel (1 kg), eluting with a gradient of 10 to 50% toluene in heptanes. The mixed fractions from the first column were purified on an AnaLogix column (330 g), eluting with a gradient of 10 to 50% toluene in heptanes. The clean material from each column was combined to give compound 3 (41.7 g, 73% yield) as a yellow oil.

2-(3-(9H-Carbazol-9-yl)-2-(methoxymethoxy)-5-methylphenyl)acetaldehyde (4)

Compound 3 (30.7 g, 85.9 mmol, 1 equiv) was dissolved in dichloromethane (600 mL) and methanol (700 mL) and cooled to −78° C. Ozone was bubbled through the solution for 2.5 hours until a yellow color persisted. The solution was sparged with air for an additional 10 minutes. The solution was quenched with dimethyl sulfide (12 mL) and stirred while warming to room temperature for 5 hours. The solution was concentrated under reduced pressure. The residue was purified over silica gel (300 g), eluting with a gradient of 0 to 60% ethyl acetate in heptanes, to give compound 4 (20.5 g, 66% yield) as a yellow oil.

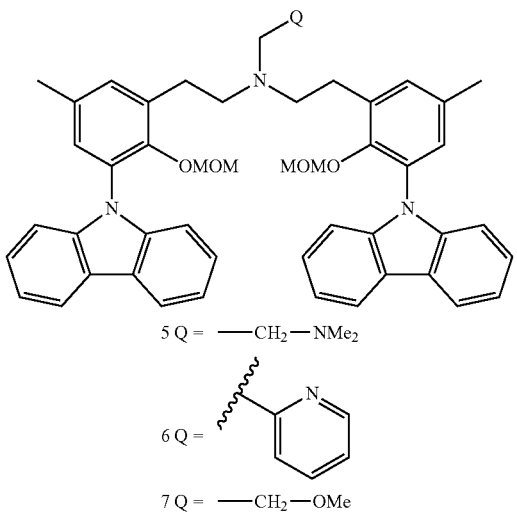

Compounds 5, 6 and 7.

The amine (1 equivalent) and compound 4 (2 equivalents, 1.391 mmol) were dissolved in 40 mL methanol and stirred at room temperature. Sodium cyanoborohydride (4 equiv) and acetic acid (8 equiv) were added to the mixture and the reaction was stirred at room temperature overnight. The reaction was concentrated, and the resulting residue was dissolved in 50 mL dichloromethane, washed with water (2×50 mL), dried with MgSO$_4$, and filtered. The filtrate was concentrated and the crude product was purified through a silica column using a solvent gradient of 5-20% ethyl acetate in hexane. Yields: compound 5=25%, compound 6=21%, compound 7=20%.

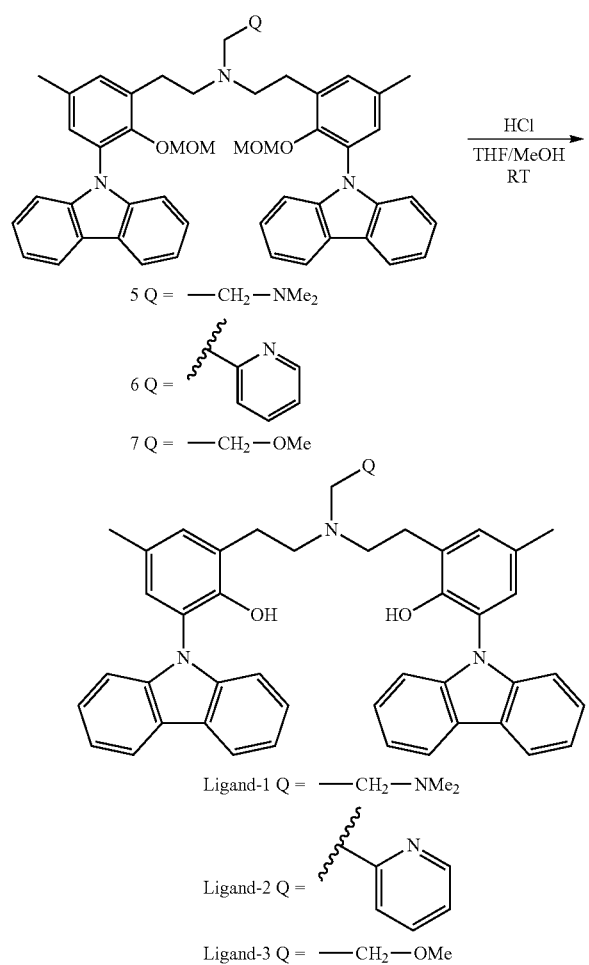

5 Q = —CH₂—NMe₂

6 Q = (2-pyridyl)

7 Q = —CH₂—OMe

Ligand-1 Q = —CH₂—NMe₂

Ligand-2 Q = (2-pyridyl)

Ligand-3 Q = —CH₂—OMe

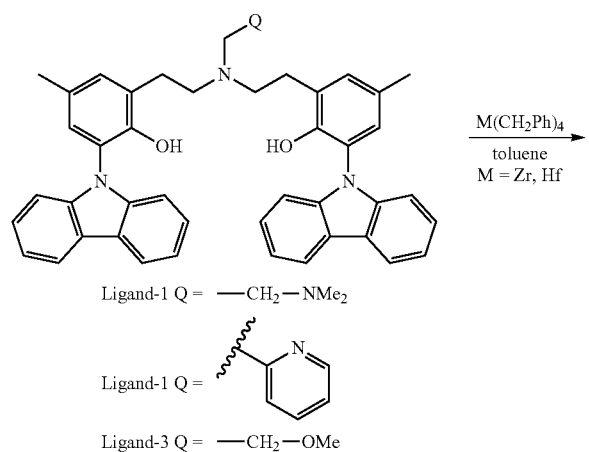

Ligand-1 Q = —CH₂—NMe₂

Ligand-1 Q = (2-pyridyl)

Ligand-3 Q = —CH₂—OMe

Ligands 1, 2, and 3.

Each of compounds 5, 6, and 7 (0.325 mmol) was dissolved in 10 mL 4:1 methanol:THF. HCl (20 equiv) was then added to the solution and the reaction was stirred at room temperature overnight. Solid sodium bicarbonate was added slowly until the mixture was slightly basic. The mixture was diluted with 30 mL ethyl acetate, washed with water (2×30 mL), dried over MgSO₄, filtered and concentrated. The resulting residue was purified through a silica column using a solvent gradient of 5-40% ethyl acetate in hexane, affording >95% of the desired ligand.

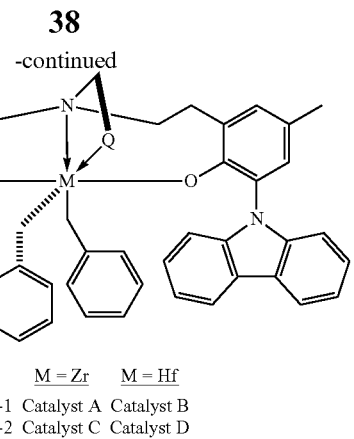

| | M = Zr | M = Hf |
|---|---|---|
| Ligand-1 | Catalyst A | Catalyst B |
| Ligand-2 | Catalyst C | Catalyst D |
| Ligand-3 | Catalyst E | Catalyst F |

Metal Complexes.

In a nitrogen purged drybox, the ligand (0.151 mmol) and the tetrabenzyl metal complex (~1 equiv) were each dissolved in 4 mL toluene. The solution of the metal complex was added dropwise to a stirring solution of the ligand, and the reaction was allowed to stir at room temperature for 1 hour. The mixture was filtered through a 0.2 μm filter and concentrated, and the resulting residue was washed with pentane and dried in vacuo. Yields: Catalyst A=78%; Catalyst B=82%; Catalyst C=75%; Catalyst D=84%; CatalystE=81%; Catalyst F=87%.

Methyl 2-(2-methoxyphenyl)acetate (8)

2-(2-hydroxyphenyl)acetic acid (15 g, 99 mmol), TBAI (approx. 100 mg), and potassium carbonate (47.7 g, 34.5 mmol) were dissolved in 185 mL of acetonitrile. Methyl iodide (15.9 mL, 255 mmol) was added and the reaction heated at 40° C. overnight. Once cool, the mixture was filtered and concentrated under reduced pressure. The resulting residue was purified by silica gel column chromatography (10% acetone/isohexane) to give the product as a pale yellow oil in 44% yield: $R_f$=0.30 (10:90 acetone:isohexane); $^1$H NMR (400 MHz, CDCl₃, δ): 3.63 (s, 2H), 3.68 (s, 3H), 3.81 (s, 3H), 6.91 (m, 2H), 7.16 (m, 1H), 7.25 (m, 1H).

2-(2-methoxyphenyl)ethan-1-ol (9)

Methyl ester (7.8 g, 43 mmol) was dissolved in 100 mL of THF and cooled to −35° C. Lithium aluminum hydride (1.8 g, 48 mmol) was added slowly and the reaction allowed to stir overnight at ambient temperature. Water (2 mL), 1 N NaOH (2 mL), and water (2 mL) were added sequentially and the mixture filtered. The filtrate was diluted with ether and washed with 10% HCl and brine, then dried (MgSO₄), filtered, and concentrated under reduced pressure to give the product as a pale yellow oil in 58% yield: $R_f$=0.17 (10:90 acetone:isohexane; $^1$H NMR (400 MHz, CDCl₃, δ): 2.90 (t, J=6.4 Hz, 2H), 8.82 (m, 5H), 6.90 (m, 2H), 7.25 (m, 2H).

1-(2-bromoethyl)-2-methoxybenzene (10)

The above alcohol (4.5 g, 27.9 mmol) was dissolved in 55 mL of dichloromethane and cooled to −35° C. Phosphorous tribromide (11 mL, 4.1 mmol) was slowly added and the reaction warmed to ambient temperature over several hours. The reaction was poured onto ice and extracted with methylene chloride. The combined organic layers were washed with saturated sodium bicarbonate, dried over MgSO₄, filtered, and concentrated to give the product as a pale yellow oil: $R_f$=0.78 (10:90 acetone:isohexane); $^1$H NMR (400 MHz, CDCl$_3$, δ): 3.16 (t, J=8.0 Hz, 2H), 3.57 (t, J=7.8 Hz, 2H), 3.81 (s, 3H), 6.87 (m, 2H), 7.13 (m, 1H), 7.23 (m, 1H).

Polymerization Examples

General Polymerization Procedures for Parallel Pressure Reactor.

Solvents, polymerization-grade toluene, and isohexane were supplied by ExxonMobil Chemical Company and purified by passing through a series of columns: two 500 cc Oxyclear cylinders in series from Labclear (Oakland, Calif.), followed by two 500 cc columns in series packed with dried 3 Å mole sieves (8-12 mesh; Aldrich Chemical Company), and two 500 cc columns in series packed with dried 5 Å mole sieves (8-12 mesh; Aldrich Chemical Company).

1-octene (C8) and 1-hexene (C6) (98%, Aldrich Chemical Company) were dried by stirring over NaK overnight followed by filtration through basic alumina (Aldrich Chemical Company, Brockman Basic 1).

Polymerization-grade ethylene (C2) was used and further purified by passing the gas through a series of columns: 500 cc Oxyclear cylinder from Labclear (Oakland, Calif.) followed by a 500 cc column packed with dried 3 Å mole sieves (8-12 mesh; Aldrich Chemical Company) and a 500 cc column packed with dried 5 Å mole sieves (8-12 mesh; Aldrich Chemical Company).

Polymerization grade propylene (C3) was used and further purified by passing it through a series of columns: 2250 cc Oxiclear cylinder from Labclear followed by a 2250 cc column packed with 3 Å mole sieves (8-12 mesh; Aldrich Chemical Company), then two 500 cc columns in series packed with 5 Å mole sieves (8-12 mesh; Aldrich Chemical Company), then a 500 cc column packed with Selexsorb CD (BASF), and finally a 500 cc column packed with Selexsorb COS (BASF).

Solutions of the metal complexes and activators were prepared in a drybox using toluene (ExxonMobil Chemical Company; anhydrous, stored under nitrogen; 98%). Concentrations were typically 0.2 mmol/L for the metal complexes and N,N-dimethyl anilinium tetrakis-pentafluorophenyl borate (Activator-1) and 0.5% w/w for methyl alumoxane (MAO).

Slurries of supported catalysts in toluene were prepared in the drybox using 45 mg of the supported catalyst and 15 mL of toluene. The resulting mixture was vortexed for uniform distribution of particles prior to injection.

For polymerization experiments with supported catalysts or Activator-1 as activator, tri-n-octylaluminum (TNOAL, neat, AkzoNobel) was used as a scavenger. Concentration of the TNOAL solution in toluene ranged from 0.5 to 2.0 mmol/L.

Polymerizations were carried out in a parallel, pressure reactor, as generally described in U.S. Pat. Nos. 6,306,658; 6,455,316; 6,489,168; WO 00/09255; and Murphy et al., J. Am. Chem. Soc., 2003, 125, pp. 4306-4317, each of which is fully incorporated herein by reference. The experiments were conducted in an inert atmosphere (N$_2$) drybox using autoclaves equipped with an external heater for temperature control, glass inserts (internal volume of reactor=23.5 mL for C2 and C2/C8; 22.5 mL for C3 runs), septum inlets, regulated supply of nitrogen, ethylene and propylene, and equipped with disposable PEEK mechanical stirrers (800 RPM). The autoclaves were prepared by purging with dry nitrogen at 110° C. or 115° C. for 5 hours and then at 25° C. for 5 hours. Although the specific quantities, temperatures, solvents, reactants, reactant ratios, pressures, and other variables are frequently changed from one polymerization run to the next, the following describes a typical polymerization performed in a parallel, pressure reactor.

Catalyst systems dissolved in solution were used in the polymerization examples below, unless specified otherwise.

Ethylene Homopolymerization (HDPE) and Ethylene-Octene Copolymerization (EO).

A pre-weighed glass vial insert and disposable stirring paddle were fitted to each reaction vessel of the reactor, which contains 48 individual reaction vessels. The reactor was then closed and purged with ethylene. Each vessel was charged with enough solvent (typically isohexane) to bring the total reaction volume, including the subsequent additions, to the desired volume, typically 5 mL. 1-octene, if required, was injected into the reaction vessel and the reactor was heated to the set temperature and pressurized to the predetermined pressure of ethylene, while stirring at 800 rpm. The aluminum and/or zinc compound in toluene was then injected as scavenger and/or chain transfer agent followed by addition of the activator solution (typically 1.0-1.2 molar equivalents of N,N-dimethyl anilinium tetrakis-pentafluorophenyl borate—Activator-1).

The catalyst solution (typically 0.020-0.080 umol of metal complex) was injected into the reaction vessel and the polymerization was allowed to proceed until a pre-determined amount of ethylene (quench value typically 20 psi) had been used up by the reaction. Alternatively, the reaction may be allowed to proceed for a set amount of time (maximum reaction time typically 30 minutes). Ethylene was added continuously (through the use of computer controlled solenoid valves) to the autoclaves during polymerization to maintain reactor gauge pressure (P setpt, +/−2 psig) and the reactor temperature (T) was monitored and typically maintained within +/−1° C. The reaction was quenched by pressurizing the vessel with compressed air. After the reactor was vented and cooled, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight, by FT-IR (see below) to determine percent octene incorporation, and by DSC (see below) to determine melting point ($T_m$).

For polymerizations using MAO as activator (typically 100 to 1000 molar equivalents), the MAO solution was injected into the reaction vessel after the addition of 1-octene and prior to heating the vessel to the set temperature and pressurizing with ethylene. No additional aluminum reagent was used as scavenger during these runs.

Equivalence is determined based on the mole equivalents relative to the moles of the transition metal in the catalyst complex.

Polymer Characterization.

Polymer sample solutions were prepared by dissolving polymer in 1,2,4-trichlorobenzene (TCB, 99+% purity from Sigma-Aldrich) containing 2,6-di-tert-butyl-4-methylphenol (BHT, 99% from Aldrich) at 165° C. in a shaker oven for approximately 3 hours. The typical concentration of polymer in solution was between 0.1 to 0.9 mg/mL with a BHT concentration of 1.25 mg BHT/mL of TCB.

To determine various molecular weight related values by GPC, high temperature size exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388; each of which is fully incorporated herein by reference for US purposes. This apparatus has a series of three 30 cm×7.5 mm linear columns, each containing PLgel 10 µm, Mix B. The GPC system was calibrated using polystyrene standards ranging from 580 to 3,390,000 g/mol. The system was operated at an eluent flow rate of 2.0 ml/minutes and an oven temperature of 165° C. 1,2,4-trichlorobenzene was used as the eluent. The polymer samples were dissolved in 1,2,4-trichlorobenzene at a concentration of 0.28 mg/mL and 400 uL of a polymer solution was injected into the system. The concentration of the polymer in the eluent was monitored using an evaporative light scattering detector. The molecular weights presented are relative to linear polystyrene standards and are uncorrected, unless indicated otherwise.

Differential Scanning Calorimetry (DSC) measurements were performed on a TA-Q100 instrument to determine the melting point ($T_m$) of the polymers. Samples were pre-annealed at 220° C. for 15 minutes and then allowed to cool to room temperature overnight. The samples were then heated to 220° C. at a rate of 100° C./min and then cooled at a rate of 50° C./min. Melting points were collected during the heating period.

The weight percent of ethylene incorporated in polymers was determined by rapid FT-IR spectroscopy on a Bruker Equinox 55+IR in reflection mode. Samples were prepared in a thin film format by evaporative deposition techniques. FT-IR methods were calibrated using a set of samples with a range of known wt % ethylene content. For ethylene-1-octene copolymers, the wt % octene in the copolymer was determined via measurement of the methyl deformation band at ~1375 $cm^{-1}$. The peak height of this band was normalized by the combination and overtone band at ~4321 $cm^{-1}$, which corrects for path length differences.

TABLE 1

Reaction conditions for ethylene-octene (EO) copolymerization with Activator-1 or MAO.

| | |
|---|---|
| Catalyst loading | 0.080 µmol |
| Activator-1 | 1.1 eq of Activator-1 or 500 eq of MAO |
| Temperature | 80° C. or 100° C. |
| Pressure setpoint | 95 or135 psi |
| 1-Octene | 100 µL |
| Total Volume | 5 mL |
| Solvent | Isohexane |
| Aluminum compound | 1 µmol tri-n-octyl aluminum |
| Quench Value | 20 psi |
| Maximum Reaction Time | 30 min |

TABLE 2

Catalyst activity and polymer properties for EO copolymerization with Activator-1 or MAO.

| Exp # | Run # | Catalyst | Activator | T (° C.) | P setpt (psi) | Time (s) | Yield (g) | activity (kg/mmol-h) | $M_w$* (kg/mol) | $M_n$* (kg/mol) | $M_w/M_n$ | wt % octene | $T_m$ (° C.) |
|---|---|---|---|---|---|---|---|---|---|---|---|---|---|
| 1 | 1 | A | Activator-1 | 80 | 95 | 1800 | 0.020 | 0.5 | 4148 | 2545 | 1.6 | 4.3 | 125.2 |
| 2 | 2 | A | Activator-1 | 80 | 95 | 1801 | 0.021 | 0.5 | 2954 | 804 | 3.7 | 3.4 | 127.8 |
| 3 | 1 | A | Activator-1 | 100 | 135 | 1800 | 0.020 | 0.5 | 2079 | 183 | 11.4 | 4.7 | 124.6 |
| 4 | 2 | A | Activator-1 | 100 | 135 | 1801 | 0.020 | 0.5 | 2474 | 268 | 9.2 | 3.9 | 120.6, 126.9 |
| 5 | 1 | A | MAO | 100 | 135 | 766 | 0.039 | 2.3 | 1501 | 40 | 37.4 | 4.9 | 118.2, 127.7 |
| 6 | 2 | A | MAO | 100 | 135 | 1039 | 0.051 | 2.2 | 1355 | 37 | 36.5 | 5.1 | 126.9 |
| 7 | 1 | B | Activator-1 | 80 | 95 | 1800 | 0.001 | 0.0 | — | — | — | — | — |
| 8 | 2 | B | Activator-1 | 80 | 95 | 1800 | 0.004 | 0.1 | — | — | — | — | — |
| 9 | 1 | B | Activator-1 | 100 | 135 | 1801 | 0.008 | 0.2 | — | — | — | — | — |
| 10 | 2 | B | Activator-1 | 100 | 135 | 1800 | 0.006 | 0.1 | — | — | — | — | — |
| 11 | 1 | B | MAO | 100 | 135 | 663 | 0.052 | 3.5 | 1784 | 400 | 4.5 | 4.0 | 127.7 |
| 12 | 2 | B | MAO | 100 | 135 | 502 | 0.043 | 3.9 | 1544 | 448 | 3.4 | 3.7 | 127.8 |
| 13 | 1 | C | Activator-1 | 80 | 95 | 107 | 0.106 | 44.5 | 542 | 352 | 1.5 | 21.6 | 84.4, 122.8 |
| 14 | 2 | C | Activator-1 | 80 | 95 | 106 | 0.087 | 36.9 | 467 | 262 | 1.8 | 21.8 | 85.5 |
| 15 | 1 | C | Activator-1 | 100 | 135 | 51 | 0.091 | 80.8 | 415 | 236 | 1.8 | 15.0 | 86.1, 93.0 |
| 16 | 2 | C | Activator-1 | 100 | 135 | 460 | 0.046 | 4.5 | 875 | 528 | 1.7 | 18.0 | 87.5 |
| 17 | 1 | C | MAO | 100 | 135 | 34 | 0.087 | 114.1 | 76 | 49 | 1.5 | 18.4 | 93.7 |
| 18 | 2 | C | MAO | 100 | 135 | 129 | 0.056 | 19.5 | 56 | 35 | 1.6 | 16.3 | 96.1 |
| 19 | 1 | D | Activator-1 | 80 | 95 | 1801 | 0.008 | 0.2 | — | — | — | — | — |
| 20 | 2 | D | Activator-1 | 80 | 95 | 1056 | 0.041 | 1.7 | 185 | 104 | 1.8 | 17.0 | 94.1, 116.7 |
| 21 | 1 | D | Activator-1 | 100 | 135 | 1801 | 0.009 | 0.2 | — | — | — | — | — |
| 22 | 2 | D | Activator-1 | 100 | 135 | 524 | 0.043 | 3.7 | 159 | 84 | 1.9 | 13.2 | 106.0 |
| 23 | 1 | D | MAO | 100 | 135 | 1434 | 0.041 | 1.3 | 10 | 7 | 1.5 | 13.8 | 96.2, 123.6 |
| 24 | 2 | D | MAO | 100 | 135 | 344 | 0.049 | 6.4 | 34 | 16 | 2.1 | 13.7 | 102.9, 125.4 |
| 25 | 1 | E | Activator-1 | 80 | 95 | 123 | 0.125 | 45.7 | 825 | 484 | 1.7 | 26.4 | 83.4 |
| 26 | 2 | E | Activator-1 | 80 | 95 | 257 | 0.052 | 9.1 | 2132 | 1398 | 1.5 | 20.9 | 80.1 |
| 27 | 1 | E | Activator-1 | 100 | 135 | 50 | 0.110 | 99.4 | 696 | 363 | 1.9 | 19.4 | 91.2 |
| 28 | 2 | E | Activator-1 | 100 | 135 | 1800 | 0.000 | 0.0 | — | — | — | — | — |
| 29 | 1 | E | MAO | 100 | 135 | 29 | 0.101 | 157.3 | 128 | 82 | 1.6 | 20.3 | 93.4 |
| 30 | 2 | E | MAO | 100 | 135 | 159 | 0.055 | 15.5 | 67 | 48 | 1.4 | 18.3 | 97.1 |
| 31 | 1 | F | Activator-1 | 80 | 95 | 1802 | 0.000 | 0.0 | — | — | — | — | — |
| 32 | 2 | F | Activator-1 | 80 | 95 | 1596 | 0.033 | 0.9 | 279 | 113 | 2.5 | 16.9 | 97.6 |
| 33 | 1 | F | Activator-1 | 100 | 135 | 1802 | 0.000 | 0.0 | — | — | — | — | — |
| 34 | 2 | F | Activator-1 | 100 | 135 | 67 | 0.003 | 2.0 | — | — | — | — | — |
| 35 | 1 | F | MAO | 100 | 135 | 1801 | 0.027 | 0.7 | 104 | 6 | 17.6 | 14.3 | 101.3, 121.2 |
| 36 | 2 | F | MAO | 100 | 135 | 417 | 0.043 | 4.6 | 33 | 13 | 2.5 | 13.7 | 105.2, 124.1 |

*Mw and Mn = GPC calibrated with polystyrene standards

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. The term "comprising" is considered synonymous with the term "including." Likewise, whenever a composition, an element, or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A ligand represented by the formula (A):

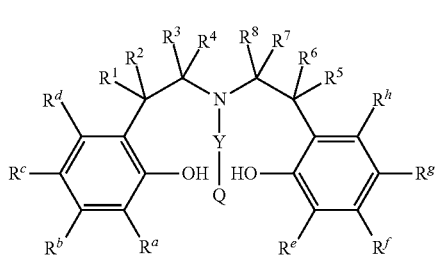

where Q is a neutral group comprising at least one atom from Group 15 or Group 16;

Y is a divalent $C_1$-$C_{40}$ hydrocarbyl or substituted divalent hydrocarbyl group, and Y can form a substituted or unsubstituted heterocycle with Q which may or may not be aromatic and may have multiple fused rings;

each $R^a$, $R^b$, $R^c$, $R^d$, $R^e$, $R^f$, $R^g$, and $R^h$ is, independently, a hydrogen, a $C_1$-$C_{40}$ hydrocarbyl radical, a $C_1$-$C_{40}$ substituted hydrocarbyl radical, a heteroatom or a heteroatom-containing group, or two or more of $R^a$ to $R^h$ adjacent to each other may independently join together to form a $C_4$-$C_{62}$ cyclic, polycyclic or heterocyclic structure, or a combination thereof; and $R^1$, $R^2$, $R^3$, $R^4$, $R^5$, $R^6$, $R^7$, and $R^8$ is, independently, a hydrogen, a $C_1$-$C_{40}$ hydrocarbyl radical, a $C_1$-$C_{40}$ substituted hydrocarbyl radical, a heteroatom or a heteroatom-containing group, or $R^1$ and or $R^2$ may form a $C_4$-$C_{62}$ cyclic or polycyclic ring structure with $R^3$ and or $R^4$, and $R^5$ and or $R^6$ may form a $C_4$-$C_{62}$ cyclic or polycyclic ring structure with $R^7$ and or $R^8$, or a combination thereof.

2. A transition metal complex represented by the formula (I):

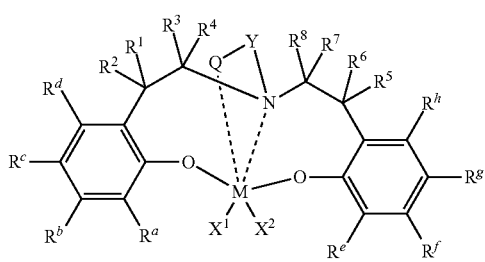

wherein M is a Group 4 transition metal;

$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;

Q is a neutral donor group;

Y is a divalent $C_1$-$C_{40}$ hydrocarbyl or substituted divalent hydrocarbyl group, and Y can form a substituted or unsubstituted heterocycle with Q which may or may not be aromatic and may or may not have multiple fused rings;

each $R^a$, $R^b$, $R^c$, $R^d$, $R^e$, $R^f$, $R^g$, and $R^h$ is, independently, a hydrogen, a $C_1$-$C_{40}$ hydrocarbyl radical, a $C_1$-$C_{40}$ substituted hydrocarbyl radical, a heteroatom or a heteroatom-containing group, or two or more of $R^a$ to $R^h$ adjacent to each other may independently join together to form a $C_4$-$C_{62}$ cyclic, polycyclic or heterocyclic structure, or a combination thereof; and $R^1$, $R^2$, $R^3$, $R^4$, $R^5$, $R^6$, $R^7$, and $R^8$ is, independently, a hydrogen, a $C_1$-$C_{40}$ hydrocarbyl radical, a $C_1$-$C_{40}$ substituted hydrocarbyl radical, a heteroatom or a heteroatom-containing group, or $R^1$ and or $R^2$ may form a $C_4$-$C_{62}$ cyclic or polycyclic ring structure with $R^3$ and or $R^4$, and $R^5$ and or $R^6$ may form a $C_4$-$C_{62}$ cyclic or polycyclic ring structure with $R^7$ and or $R^8$, or a combination thereof.

3. The transition metal complex of claim 2, wherein M is Hf or Zr or Ti.

4. The transition metal complex of claim 2, wherein $R^a$ and $R^e$ are carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, substituted fluorenyl, phenyl, substituted phenyl, naphthyl substituted naphthyl, anthracenyl, substituted anthracenyl, phenanthryl, substituted phenanthryl, pyrenyl, substituted pyrenyl, cyclohexyl, substituted cyclohexyl, adamantyl, substituted adamantyl, methyl, ethyl, or an isomer of propyl, butyl, pentyl or hexyl.

5. The transition metal complex of claim 2, wherein Q is a neutral donor group comprising at least one atom from Group 15 or Group 16 and the -(-Q-Y—)— fragment can form a substituted or unsubstituted heterocycle which may or may not be aromatic and may or may not have multiple fused rings.

6. The transition metal complex of claim 2, wherein Q comprises O, N, S, or P.

7. The transition metal complex of claim 2, wherein Q is furanyl, tetrahydrofuranyl, pyridyl, $NR'_2$, OR', SR', $PR'_2$, where R' is, independently, a hydrogen, a $C_1$-$C_{40}$ hydrocarbyl radical, a $C_1$-$C_{40}$ substituted hydrocarbyl radical, a heteroatom or a heteroatom-containing group.

8. The transition metal complex of claim 2, wherein $R^a$ and $R^e$ are the same.

9. The transition metal complex of claim 2, wherein $R^a$ and $R^e$ are different.

10. The transition metal complex of claim 2, wherein the catalyst complex is represented by formula:

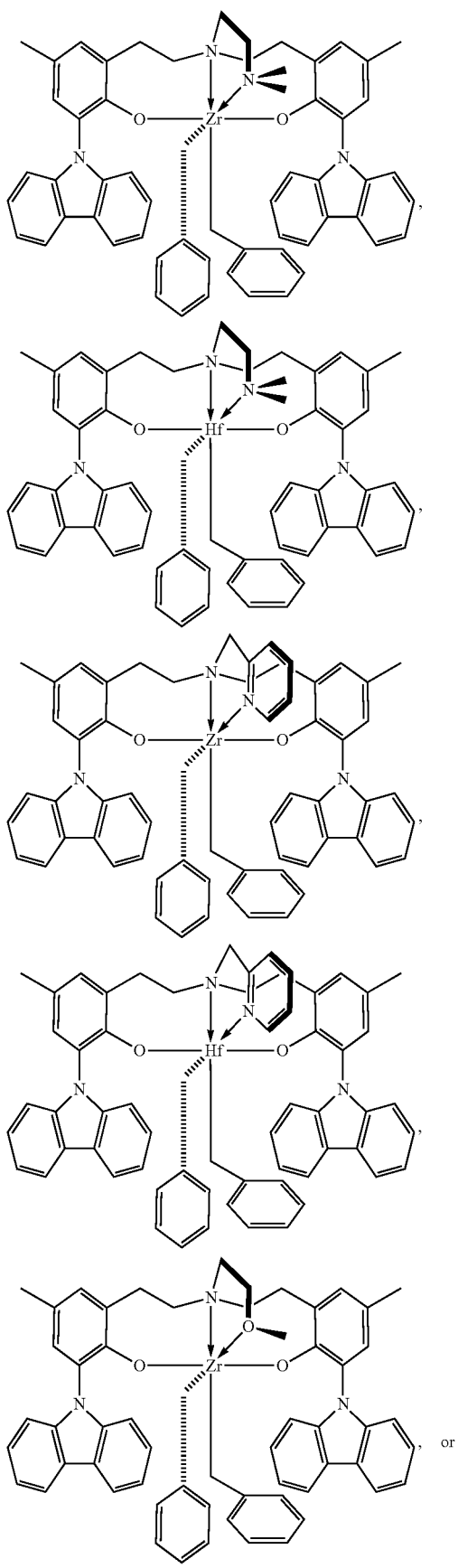

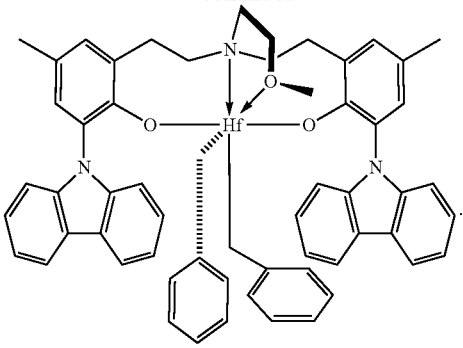

11. A catalyst system comprising activator and the transition metal complex of claim 2.

12. The catalyst system of claim 11, wherein the catalyst system further comprises chain transfer agent.

13. The catalyst system of claim 11, wherein the catalyst system further comprises chain transfer agent represented by the formula $R_3Al$ or $R_2Zn$, where R is a $C_1$ to $C_{20}$ alkyl group.

14. The catalyst system of claim 11, wherein the activator is an alumoxane.

15. The catalyst system of claim 11, wherein the activator is a non-coordinating anion.

16. The catalyst system of claim 11, wherein the activator is selected from the group consisting of: methylalumoxane, ethylalumoxane, isobutyl alumoxane, N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetra(perfluorophenyl)borate, triphenylcarbenium tetrakis(perfluorophenyl)borate, 1-(4-(tris(pentafluorophenyl)borate)-2,3,5,6-tetrafluorophenyl)pyrrolidinium, tetrakis(pentafluorophenyl)borate, 4-(tris(pentafluorophenyl)borate)-2,3,5,6-tetrafluoropyridine, bis(hydrogenatedtallow)methylammonium and related long-chain alkylammonium tetra(perfluorophenyl)borate, and bis(hydrogenatedtallow)methylammonium and related long-chain alkylammonium tetrakis(perfluoronaphthyl)borate.

17. A polymerization process to produce polyolefin comprising: a) contacting one or more olefin monomers with the catalyst system of claim 11; and b) obtaining olefin polymer.

18. The process of claim 17, wherein the monomer comprises ethylene.

19. The process of claim 17, wherein the monomer comprises propylene.

20. The process of claim 17, wherein the transition metal complex is supported.

21. The process of claim 17, wherein the catalyst system further comprises chain transfer agent, represented by the formula $R_3Al$ and/or $R_2Zn$, and the chain transfer agent is present at a molar ratio of transition metal to Al and Zn of at least 10:1, where R is a $C_1$ to $C_{40}$ alkyl group.

22. The process of claim 21, wherein the chain transfer agent is present at a molar ratio of transition metal to Al and Zn of at least 100:1.

23. The process of claim 17, wherein the process is a continuous process.

24. The process of claim 17, wherein step a) occurs at a temperature of at least 80° C.

25. The process of claim 17, wherein step a) occurs at a temperature of at least 110° C.

26. The process of claim 17, wherein hydrogen is present in step a).

27. The process of claim 17, wherein hydrogen and chain transfer agent are present in step a).

28. The ligand of claim 1, wherein $R^a$ and $R^e$ are carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, substituted fluorenyl, phenyl, substituted phenyl, naphthyl substituted naphthyl, anthracenyl, substituted anthracenyl, phenanthryl, substituted phenanthryl, pyrenyl, substituted pyrenyl, cyclohexyl, substituted cyclohexyl, adamantyl, substituted adamantyl, methyl, ethyl, or an isomer of propyl, butyl, pentyl or hexyl.

29. The ligand of claim 1, wherein Q is a neutral donor group comprising at least one atom from Group 15 or Group 16 and the -(-Q-Y—)— fragment can form a substituted or unsubstituted heterocycle which may or may not be aromatic and may or may not have multiple fused rings.

30. The ligand of claim 1, wherein Q comprises O, N, S, or P.

31. The ligand of claim 1, wherein Q is furanyl, tetrahydrofuranyl, pyridyl, NR'$_2$, OR', SR', PR'$_2$, where R' is, independently, a hydrogen, a $C_1$-$C_{40}$ hydrocarbyl radical, a $C_1$-$C_{40}$ substituted hydrocarbyl radical, a heteroatom or a heteroatom-containing group.

32. The ligand of claim 1, wherein $R^a$ and $R^e$ are the same.

33. The ligand of claim 1, wherein $R^a$ and $R^e$ are different.

34. A catalyst system comprising activator and the transition metal complex of claim 4, wherein M is Zr, Hf or Ti; and Q is a neutral donor group comprising at least one atom from Group 15 or Group 16 and the -(-Q-Y—)-fragment can form a substituted or unsubstituted heterocycle which may or may not be aromatic and may or may not have multiple fused rings.

35. A catalyst system comprising activator and the transition metal complex of claim 4, wherein M is Zr, Hf or Ti; and Q is furanyl, tetrahydrofuranyl, pyridyl, NR'$_2$, OR', SR', PR'$_2$, where R' is, independently, a hydrogen, a $C_1$-$C_{40}$ hydrocarbyl radical, a $C_1$-$C_{40}$ substituted hydrocarbyl radical, a heteroatom or a heteroatom-containing group.

36. A catalyst system comprising activator and the transition metal complex of claim 10.

37. The catalyst system of claim 34, wherein the activator is selected from the group consisting of: methylalumoxane, ethylalumoxane, isobutyl alumoxane, N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetra(perfluorophenyl)borate, triphenylcarbenium tetrakis(perfluorophenyl)borate, 1-(4-(tris(pentafluorophenyl)borate)-2,3,5,6-tetrafluorophenyl)pyrrolidinium, tetrakis(pentafluorophenyl)borate, 4-(tris(pentafluorophenyl)borate)-2,3,5,6-tetrafluoropyridine, bis(hydrogenatedtallow)methylammonium and related long-chain alkylammonium tetra(perfluorophenyl)borate, and bis(hydrogenatedtallow)methylammonium and related long-chain alkylammonium tetrakis(perfluoronaphthyl)borate.

38. The catalyst system of claim 35, wherein the activator is selected from the group consisting of: methylalumoxane, ethylalumoxane, isobutyl alumoxane, N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetra(perfluorophenyl)borate, triphenylcarbenium tetrakis(perfluorophenyl)borate, 1-(4-(tris(pentafluorophenyl)borate)-2,3,5,6-tetrafluorophenyl)pyrrolidinium, tetrakis(pentafluorophenyl)borate, 4-(tris(pentafluorophenyl)borate)-2,3,5,6-tetrafluoropyridine, bis(hydrogenatedtallow)methylammonium and related long-chain alkylammonium tetra(perfluorophenyl)borate, and bis(hydrogenatedtallow)methylammonium and related long-chain alkylammonium tetrakis(perfluoronaphthyl)borate.

39. The catalyst system of claim 36, wherein the activator is selected from the group consisting of: methylalumoxane, ethylalumoxane, isobutyl alumoxane, N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetra(perfluorophenyl)borate, triphenylcarbenium tetrakis(perfluorophenyl)borate, 1-(4-(tris(pentafluorophenyl)borate)-2,3,5,6-tetrafluorophenyl)pyrrolidinium, tetrakis(pentafluorophenyl)borate, 4-(tris(pentafluorophenyl)borate)-2,3,5,6-tetrafluoropyridine, bis(hydrogenatedtallow)methylammonium and related long-chain alkylammonium tetra(perfluorophenyl)borate, and bis(hydrogenatedtallow)methylammonium and related long-chain alkylammonium tetrakis(perfluoronaphthyl)borate.

40. A polymerization process comprising: contacting one or more olefin monomers with the catalyst system of claim 34 to produce an olefin polymer.

41. A polymerization process comprising: contacting one or more olefin monomers with the catalyst system of claim 37 to produce an olefin polymer.

42. The polymerization process of claim 40, further comprising contacting the one or more olefin monomers and the catalyst system with hydrogen and a chain transfer agent.

* * * * *